(12) United States Patent
Perreault et al.

(10) Patent No.: US 10,644,503 B2
(45) Date of Patent: May 5, 2020

(54) COUPLED SPLIT PATH POWER CONVERSION ARCHITECTURE

(71) Applicant: Massachusetts Institute of Technology, Cambridge, MA (US)

(72) Inventors: David J. Perreault, Cambridge, MA (US); Khurram K. Afridi, Boulder, CO (US); Minjie Chen, Brighton, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 369 days.

(21) Appl. No.: 15/290,402

(22) Filed: Oct. 11, 2016

(65) Prior Publication Data

US 2018/0102644 A1 Apr. 12, 2018
US 2019/0165573 A9 May 30, 2019

Related U.S. Application Data

(63) Continuation-in-part of application No. 14/911,774, filed as application No. PCT/US2014/062859 on Oct. 29, 2014, now Pat. No. 9,825,545.
(Continued)

(51) Int. Cl.
*H02J 1/00* (2006.01)
*H02M 3/335* (2006.01)
(Continued)

(52) U.S. Cl.
CPC ............... *H02J 1/00* (2013.01); *H02M 3/158* (2013.01); *H02M 3/335* (2013.01);
(Continued)

(58) Field of Classification Search
CPC ............... H02J 1/00; H02M 3/00; H02M 7/00
(Continued)

(56) References Cited

U.S. PATENT DOCUMENTS 5,461,297 A 10/1995 Crawford
5,886,888 A 3/1999 Akamatsu et al.
(Continued)

FOREIGN PATENT DOCUMENTS

| WO | WO-2013134573 A1 * | 9/2013 | .......... H02M 3/3376 |
| WO | WO 2015/069516 A1 | 5/2015 | |
| WO | WO 2015069516 A1 * | 5/2015 | ............ H02M 3/335 |

OTHER PUBLICATIONS

Office Action dated Jun. 5, 2017 for U.S. Appl. No. 14/911,774; 42 pages.
(Continued)

*Primary Examiner* — Rexford N Barnie
*Assistant Examiner* — Joseph N Inge
(74) *Attorney, Agent, or Firm* — Daly, Crowley, Mofford & Durkee LLP

(57) ABSTRACT

Described herein are power conversion systems and related techniques which utilize a coupled split path (CSP) circuit architecture. The CSP structure combines switches, capacitors and magnetic elements in such a way that power is processed in multiple coupled split paths in a variety of voltage domains. These techniques are well suited for power conversion applications that have one or more input/output ports that have a wide voltage range, or if the application is interfacing with the ac line voltage and requires power-factor correction.

24 Claims, 18 Drawing Sheets

Related U.S. Application Data

(60) Provisional application No. 61/896,702, filed on Oct. 29, 2013.

(51) Int. Cl.
  *H02M 7/68* (2006.01)
  *H02M 3/158* (2006.01)
  *H02M 7/12* (2006.01)
  *H02M 1/00* (2006.01)

(52) U.S. Cl.
  CPC ... *H02M 3/33546* (2013.01); *H02M 3/33569* (2013.01); *H02M 3/33576* (2013.01); *H02M 7/12* (2013.01); *H02M 7/68* (2013.01); *H02M 2001/007* (2013.01); *H02M 2001/0058* (2013.01); *H02M 2001/0074* (2013.01); *H02M 2001/0077* (2013.01); *Y02B 70/1491* (2013.01)

(58) Field of Classification Search
  USPC .......................................................... 307/18
  See application file for complete search history.

(56) References Cited

U.S. PATENT DOCUMENTS

| | | | |
|---|---|---|---|
| 6,353,547 B1 | 3/2002 | Jang et al. | |
| 6,650,552 B2 | 11/2003 | Takagi et al. | |
| 7,596,002 B2 | 9/2009 | Teichmann | |
| 8,718,188 B2 | 5/2014 | Balteanu et al. | |
| 9,825,545 B2 | 11/2017 | Chen et al. | |
| 2003/0086282 A1 | 5/2003 | Zeng et al. | |
| 2004/0254215 A1 | 12/2004 | Ambo et al. | |
| 2006/0152947 A1 | 7/2006 | Baker et al. | |
| 2009/0231887 A1* | 9/2009 | Ye ..................... | H02M 3/33569 363/21.02 |
| 2014/0049990 A1* | 2/2014 | Limpaecher ............ | H02M 3/24 363/15 |
| 2014/0112026 A1 | 4/2014 | Pan et al. | |
| 2014/0153303 A1* | 6/2014 | Potharaju ................ | H02M 7/06 363/126 |
| 2014/0167513 A1 | 6/2014 | Chang et al. | |
| 2014/0226378 A1 | 8/2014 | Perreault et al. | |
| 2014/0313781 A1 | 10/2014 | Perreault et al. | |
| 2014/0339918 A1 | 11/2014 | Perreault et al. | |
| 2014/0355322 A1 | 12/2014 | Perreault et al. | |
| 2015/0023063 A1* | 1/2015 | Perreault ............. | H02M 3/337 363/17 |
| 2015/0029761 A1* | 1/2015 | Trinh ..................... | H02M 1/36 363/17 |
| 2015/0035453 A1 | 2/2015 | Seki et al. | |
| 2015/0084701 A1 | 3/2015 | Perreault et al. | |
| 2015/0155895 A1 | 6/2015 | Perreault et al. | |
| 2015/0171768 A1 | 6/2015 | Perreault et al. | |
| 2015/0188448 A1 | 6/2015 | Perreault et al. | |

OTHER PUBLICATIONS

Response to Jun. 5, 2017 Office Action for U.S. Appl. No. 14/911,774, dated Aug. 31, 2017; 13 pages.
Notice of Allowance dated Sep. 20, 2017 for U.S. Appl. No. 14/911,774; 13 pages.
U.S. Appl. No. 14/920,031, filed Oct. 22, 2015, Briffa, et al.
U.S. Appl. No. 14/968,045, filed Dec. 14, 2015, Perreault, et al.
U.S. Appl. No. 14/934,760, filed Nov. 6, 2015, Briffa, et al.
U.S. Appl. No. 14/823,220, filed Aug. 11, 2015, Barton et al.
U.S. Appl. No. 14/435,914, filed Apr. 15, 2015, Perreault, et al.
U.S. Appl. No. 14/758,033, filed Jun. 26, 2015, Perreault, et al.
U.S. Appl. No. 14/791,685, filed Jul. 6, 2015, Perreault, et al.
U.S. Appl. No. 14/911,774, filed Feb. 12, 2016, Chen et al.
U.S. Appl. No. 14/975,742, filed Dec. 19, 2015, Perreault, et al.
U.S. Appl. No. 14/974,563, filed Dec. 18, 2015, Perreault, et al.
U.S. Appl. No. 15/149,491, filed May 9, 2016, Perreault, et al.
U.S. Appl. No. 15/287,068, filed Oct. 6, 2016, Briffa, et al.
U.S. Appl. No. 15/354,170, filed Nov. 17, 2016, Briffa, et al.
PCT International Search Report of the ISA for PCT Appl. No. PCT/US2017/055841 dated Jan. 19, 2018; 5 pages.
PCT Written Opinion of the ISA for PCT Appl. No. PCT/US2017/055841 dated Jan. 19, 2018; 6 page.
PCT International Preliminary Report on Patentability dated Apr. 25, 2019 for PCT Application No. PCT/US2017/055841, 8 pages.

* cited by examiner

COUPLED SPLIT PATH POWER CONVERSION ARCHITECTURE

CROSS REFERENCE TO RELATED APPLICATION

This application is a continuation-in-part of U.S. application Ser. No. 14/911,774 filed on Feb. 12, 2016 now issued as U.S. Pat. No. 9,825,545 issued on Nov. 21, 2017, which is the U.S. National Stage of International Application No. PCT/US2014/062859, which designated the United States and was filed on Oct. 29, 2014 and published in English on May 14, 2015 as PCT Publication No. WO2015/069516. International Application No. PCT/US2014/062859 claims the benefit of U.S. Provisional Application No. 61/896,702, filed on Oct. 29, 2013.

GOVERNMENT RIGHTS

Not applicable.

FIELD

This patent application relates generally to power converter circuits and more particularly, to the use of magnetic circuit structures (e.g. transformer or coupled inductor structures), inverter and rectifier structures and associated control techniques for use in power converter circuits.

BACKGROUND

As is known in the art, in power electronics there exists a class of circuits referred to as power converter circuits (or more simply "power converters"). Power converters convert electrical energy from one form to another (e.g. converting between ac and dc, changing the voltage or frequency of a signal or some combination of the above).

As is also known, power supplies may include power converters used for direct current (dc) distribution systems, computers, telecommunications and data centers, as well as for transportation, lighting, displays, and medical applications among many other areas require high power density and fast response characteristics. Ideally power supplies provide electrical isolation between a source and a load and operate efficiently. In many cases, there is a desire for efficiency at high conversion ratios and/or over wide operating ranges of voltages and/or powers. There is also a desire to provide power supplies having a high degree of integration, manufacturability and reliability. Traditionally, power supplies having magnetic converter-based architectures with isolation transformers are widely used, such as forward converters, flyback converters and related architectures. Such architectures are generally simple, low-cost and easy to control.

There is, however, a continued trend to operate power converters at ever increasing switching frequencies. As switching frequencies increase, the converter timing required in the aforementioned magnetic converter-based architectures becomes difficult to satisfy, and the effects of parasitic circuit elements (or more simply "parasitics") may significantly increase loss characteristics of the converter.

As is also known, one approach to providing converters in such high frequency applications includes the use of circuits which utilize high-gain transformers or coupled inductors. Circuits incorporating tapped inductors can provide desirable duty ratios and reduce device switching stress. Leakage inductances of such tapped inductors, however, can resonate (or "ring") with a parasitic capacitance of the switches at certain frequencies. This limits the feasibility of this approach at high switching frequencies.

High-frequency-link architectures can reduce or eliminate this ringing problem by "absorbing" parasitic circuit elements, such as transformer leakage inductance, into circuit operation.

Such circuits can often also be implemented utilizing so-called "soft switching" techniques which enables switching at frequencies which are higher than operational frequencies of conventional hard-switched architectures.

Nevertheless, as desired operating switching frequencies for power converters keep increasing, parasitic effects which are sometimes ignored (such as the proximity effect loss and transformer parasitic capacitances), can become very important. Furthermore, requirements that a system achieve high performance (i.e. the system achieves a desired level of efficiency and power density, in addition to meeting other functional requirements including but not limited to ac line synchronization, total harmonic distortion (THD), and power factor) over a wide operating range, e.g. universal line input voltages, makes system designs even more challenging.

SUMMARY

In accordance with the concepts circuits and techniques described herein, power conversion systems which utilize a circuit structure referred to herein as a coupled split path (CSP) structure combines switches and magnetic circuit elements in such a way that power is processed in multiple, coupled split paths.

With this particular arrangement, the effect of parasitic circuit elements (herein after "parasitic effects" or more simply "parasitics") can be effectively absorbed into circuit operation. In some instances, parasitic effects may primarily be a parasitic capacitance characteristic. In some instances, parasitic effects may primarily be a parasitic inductance characteristic. In some instances, parasitic effects may a combination of parasitic capacitance characteristic accompanied by some or all of parasitic inductance and parasitic resistance characteristics.

Processing power in multiple, paths reduces (and ideally eliminates) the effects of such parasitics which enables transformers to operate closer to their ideal transformer characteristics, than in prior art approaches. A circuit having the CSP architecture described herein can be connected to an optional power distributor to split power provided from one or more sources into multiple voltage domains, and to compress the required operation range of each voltage domain. This approach enables the power converter to work efficiently over an operational range of power which is wider than prior art approaches. Circuits having the CSP architecture can also be connected to an optional power combiner to combine the power delivered by the multiple coupled split-paths and deliver the power to one or multiple loads.

In accordance with the concepts, systems, circuits and techniques described herein, it has been recognized that in prior art techniques, transformer proximity effects and parasitic capacitances set a barrier for increasing the switching frequency of an isolated power converter.

In accordance with one aspect of the concepts, circuits and techniques described herein, a coupled split path circuit includes a plurality of magnetically coupled current paths that process power in multiple voltage domains. This reduces the impact of parasitics in circuit operation and compresses the converter operation range. This results in improved transformer performance and thus allows increasing the switching frequency of an isolated power converter. The coupled split path architecture also offers other advantages including, but not limited to, reduced inductor size and improved efficiency performance as compared to inductor size and efficiency performance provided by conventional architectures.

In accordance with a further aspect of the concepts described herein, a converter technique including processing electrical energy in multiple correlated paths. The multiple paths can be coupled through magnetic correlation (i.e. coupled with a single magnetic linkage), or through capacitive energy transferring by using switched capacitor circuits, or through a combination of both magnetic correlation and capacitive energy transfers. This technique enables many circuit advantages including, but not limited to, reduction of parasitic effects and improved transformer performance.

In some embodiments, a power distributor may be coupled between one or more input sources and one or more inputs of the CSP circuit.

In some embodiments a power combiner may be coupled between one or more outputs of the CSP circuit and one or more loads.

In some embodiments a conversion system includes a CSP circuit and one or both of a power distributor and a power combiner.

It should be appreciated that elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

In an embodiment, a coupled split path (CSP) voltage converter having one or more input ports and one or more output ports, includes a set of inverter cells electrically coupled such that their input ports are cascaded to form a series chain, providing a set of terminals at the inverter inputs forming a set of N voltages levels of increasing magnitude relative to a reference potential. The CSP voltage converter further includes a power distributor circuit having an input and a set of outputs and comprising an inductor and a switch network. The power distributor circuit coupled so as to draw power from its input and deliver power via its outputs into at least two of the set of N voltage levels. The CSP voltage converter further includes a transformer having at least three windings, wherein each inverter cell drives a transformer winding, and one or more rectifier circuit cells each having an output port and an input coupled to a transformer winding.

In embodiments, the set of terminals at the inverter inputs form exactly N=2 voltage levels. In embodiments, the set of terminals at the inverter inputs form exactly N=2 voltage levels. and the voltage levels provide substantially equal input voltages to the inverters.

In embodiments, the power distributer circuit comprises an inductor and two pairs of switches, each pair in a half-bridge configuration and the switches operate to switch one end of the inductor between a reference potential, a first voltage level of the inverter cells, and a second voltage level of the inverter cells.

In embodiments, at least one switch of the power distributor circuit comprises a diode.

In embodiments, each of the plurality of inverter circuit cells is coupled with another inverter circuit cell via a flying capacitor to provide capacitor charge transfer for voltage equalization among inverter cells.

In embodiments, power transferred among the inverter and rectifier cells are exchanged by a combination of capacitive energy transfer (e.g. via flying capacitors) and magnetic energy transfer (e.g. via the said multi-winding transformer).

In embodiments, the converter input is an ac voltage.

In embodiments, the converter is provided with an energy buffer capacitor connected to two nodes of the inverter circuit cells.

In embodiments the power distributor is controlled over the ac line cycle to draw energy from an ac voltage at high power factor.

In embodiments, the power distribution stage further comprises a second inductor or an additional inductor winding to form a coupled inductor.

In embodiments, switches of the power distribution stage are further configured to operate to also provide bridgeless power factor correction rectification.

In embodiments, each of the plurality of inverter circuit cells is coupled with another inverter circuit cell via a flying capacitor to provide capacitor charge transfer for voltage equalization among inverter cells.

In embodiments, power transferred among the inverter and rectifier cells are exchanged by a combination of capacitive energy transfer via flying capacitors and magnetic energy transfer via the said multi-winding transformer.

In embodiments, at least one end of the inductor in a power distributor circuit is dynamically switched among two or more of N dc voltage levels.

In embodiments, the power distributor circuit comprises at least two switches configured as a half-bridge.

In embodiments, the power distributor circuit comprises at least two switches controlled by pulse-wide-modulated (PWM) signals to regulate the voltage of one or more of the voltage levels.

In embodiments, the converter comprises exactly two inverter cells.

In embodiments, the converter comprises exactly two inverter cells and at least one rectifier cell.

In embodiments, the transformer is a distributed printed circuit transformer implemented in a printed circuit board.

In embodiments, the current of the inductor is made bidirectional within a switching cycle to provide zero-voltage-switching (ZVS) or near ZVS soft switching operation of one or more switches of the power distributor.

In embodiments, the output of each of the plurality of N inverters is coupled to a transformer winding by at least one dc voltage blocking capacitor.

In embodiments, the plurality of N inverters are controlled by synchronized signals.

In embodiments, net load impedances seen by the plurality of N inverters are inductive at the switching frequency of the N inverters to realize ZVS.

In embodiments, at least one switch in the power distributor circuit is implemented as a diode.

In embodiments, the voltage of at least one of the input/output ports comprises an ac line voltage, and the circuit performs power-factor correction via control of the switches in the power distributor circuit.

In embodiments, an energy buffer circuit is coupled between the highest voltage level and the ground that is sized to buffer at least the twice-line-frequency energy for power factor correction conversion. In embodiments, the energy buffer circuit is directly connected between the highest voltage level and the ground that is sized to buffer at least the twice-line-frequency energy for power factor correction conversion. In embodiments, the energy buffer circuit is provided as a capacitor.

In embodiments, a capacitor is connected between the highest voltage level and ground. In embodiments, the capacitor is an electrolytic capacitor which buffers the energy difference between that provided at the input port and that supplied to the output port.

In embodiments, the switches and inductors utilized in the power distributor are also utilized to realize bridgeless power factor correction.

In accordance with a further aspect of the concepts described herein, a power conversion method comprises distributing power from one input source to a plurality of N inverter circuit cells having their input ports cascaded by: utilizing an inductor and a one or more switches to deliver energy from an input to at least two of the inverter inputs by switching at least one terminal of the inductor among at least two inverter input terminals and balancing input voltages of the plurality of N inverter circuit cells via one or both of switched-capacitor energy transfer and magnetic coupling; providing power from the plurality of N inverter cells to the inputs of a three or more winding magnetic component operating via magnetic coupling to step up or down voltage; and delivering power transferred via the magnetic component to an output by rectification, In embodiments, the method further includes utilizing an even number of inverter cells. In embodiments, the method further includes utilizing exactly N=2 inverter cells.

In embodiments, the method further includes switching one terminal of the inductor among a reference potential, the input terminal of a first inverter cell and the input terminal of a second inverter cell.

In embodiments, the method further includes providing the input source as an ac line voltage.

In embodiments, the method further includes providing a twice-line-frequency energy buffer capacitor across the cascade of inverter input terminals.

In embodiments, the method further includes utilizing switching of the inductor terminal to provide power factor correction.

In embodiments, the method further includes providing a second inductor or second inductor winding to form a coupled inductor.

In embodiments, the method further includes utilizing switching of first and second inductor terminals to further provide rectification.

DETAILED DESCRIPTION

Before proceeding with a detailed description of FIGS. 1-20 below, some introductory concepts are explained. In general overview, the power conversion concepts, circuits and techniques described herein utilize a circuit structure referred to herein as a coupled split path (CSP) structure. A CSP structure combines switches and magnetic circuit elements (or more simply "magnetics") in such a way that power is processed in multiple coupled split paths. The multiple split paths can be coupled through magnetic correlation (e.g. coupled with a single magnetic linkage), or through capacitive energy transfer (e.g. by using switched capacitor circuits) or through a combination of both magnetic correlation and capacitive energy transfer.

With such a circuit configuration (i.e., multiple split paths), parasitic circuit element effects (e.g. the effects of parasitic capacitance, parasitic inductance and/or parasitic resistance characteristics) can be absorbed into circuit operation thereby effectively reducing the effects of parasitics in circuit operation. Processing power in multiple paths reduces, and ideally eliminates, the impact of such parasitic effects on circuit operation and thus enables the magnetic circuit elements (e.g. a transformer) to operate closer to ideal characteristics (e.g. ideal transformer characteristics). Circuits having the CSP architecture are thus able to utilize circuit components having lower voltage/current ratings and smaller parasitics. At the same time, the parasitic effects are also reduced due to reduced voltage/current transitions.

As will become further apparent from the description herein below, the CSP architecture described herein can be coupled to a power distributor to split power provided by one or more sources into multiple voltage domains, and to compress the required operation range of each voltage domain. Splitting the overall voltage domain into multiple smaller voltage domains compresses the operational range of the converter while the multiple split paths in the CSP compresses the voltage domains. This enables a CSP power converter to work efficiently over an operating voltage range which is wider than operating voltage ranges of prior art systems. Furthermore, circuits utilizing the CSP architecture described herein can also be coupled to an optional power combiner to combine the power delivered by the multiple coupled split-paths and deliver the power to one or multiple loads.

Figure 1:
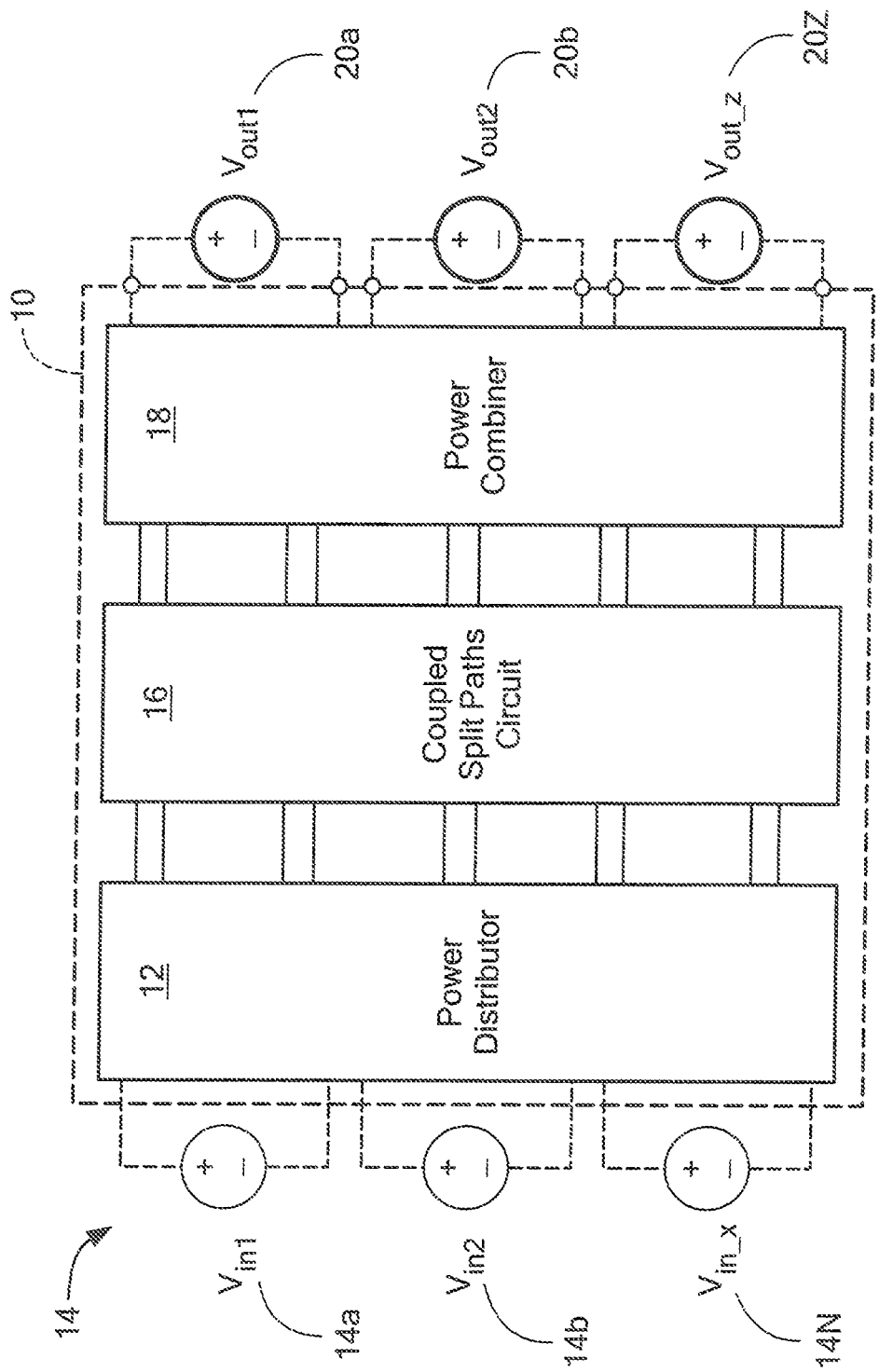
FIG. 1 is a block diagram illustrating an architecture of a coupled split path (CSP) power conversion circuit.

Referring now to FIG. 1, a coupled split path (CSP) power conversion circuit 10 includes an optional power distribution circuit 12 (also sometimes referred to herein as a power distributor) configured to receive signals from one or more input signal sources 14a-14N, generally denoted 14. Signal sources 14 are here shown in phantom since they are not properly a part of CSP power conversion circuit 10. Power distribution circuit 12 receives the signals provided thereto and distributes the signals to one or more inputs of a CSP circuit 16. Further functionality of distribution circuit 12 will be described below. Briefly, however, the power distribution circuit may receive an overall input power and voltage from one or multiple sources, condition the power provided thereto (e.g. modulate the power provided thereto) and distribute the power to multiple paths to interface with a coupled split path (CSP) circuit (to be described below). It should be appreciated that modulating the power may be accomplished, for example, via phase and amplitude control. Those of ordinary skill in the art will appreciate that other power modulation techniques well know to those of ordinary skill in the art may, of course, also be used.

It should be understood that a power distributor may not always be necessary, but it is useful in a number of applications when there are input/output ports that has wide operation range. An appropriate power distributor design enables the remainder part of the system (e.g. the CSP and an optional power combiner) to be optimized for a compressed operating range. This leads to a higher efficiency of the overall system since a power converter optimized for a fixed operating point can typically achieve higher performance (efficiency/power density) than a converter which operates across a wide operation range (a wide operation range converter has to function in the worst case, thereby limiting its overall performance). A voltage regulation capability is also realized with the power distributor.

As noted above, a power distributor is optional and in some embodiments input sources 14 may provide properly phased and amplitude controlled power flows directly to inputs of power distributor 12. In such an approach, the impedances of the multiple coupled split paths should preferably be well matched to achieve a desired level of performance. Using a printed-circuit-board (PCB) embedded planar magnetic structure is a technique for providing/controlling a matched impedance. Other techniques may, of course, also be used.

CSP circuit 16 is provided having a structure such that it delivers power in multiple coupled split paths, and has multiple inverter and rectifier circuit cells that interface with the coupled split paths. As will become apparent from the description provided herein below, CSP circuits 16 utilizes a combination of switches and magnetic circuit elements (or more simply "magnetics") so as to form the multiple coupled split paths in which power is processed. CSP circuit 16 processes the signals provided thereto and provides properly phased and amplitude balanced power flows to one or more inputs of an optional power combiner circuit 18. In one embodiment, the outputs from CSP 16 are provided having equal amplitude and equal phase.

Power combiner circuit 18 receives the signals provided thereto and combines the signals to provide output power to one or more loads 20 (with loads 20a-20z here being shown in phantom since they are not properly a part of CSP power conversion circuit 10. The power combiner collects energy from the multiple paths of the CSP, and manipulates the energy into a format that can interface with one or more output loads. As noted above, power combiner may not always be needed. In some applications, the power combiner can be avoided by appropriately selecting the CSP output structure. In applications where the number of outputs of the CSP does not equal to the number of outputs that the system requires, a power combiner would be desirable and in some cases necessary.

Figure 2:
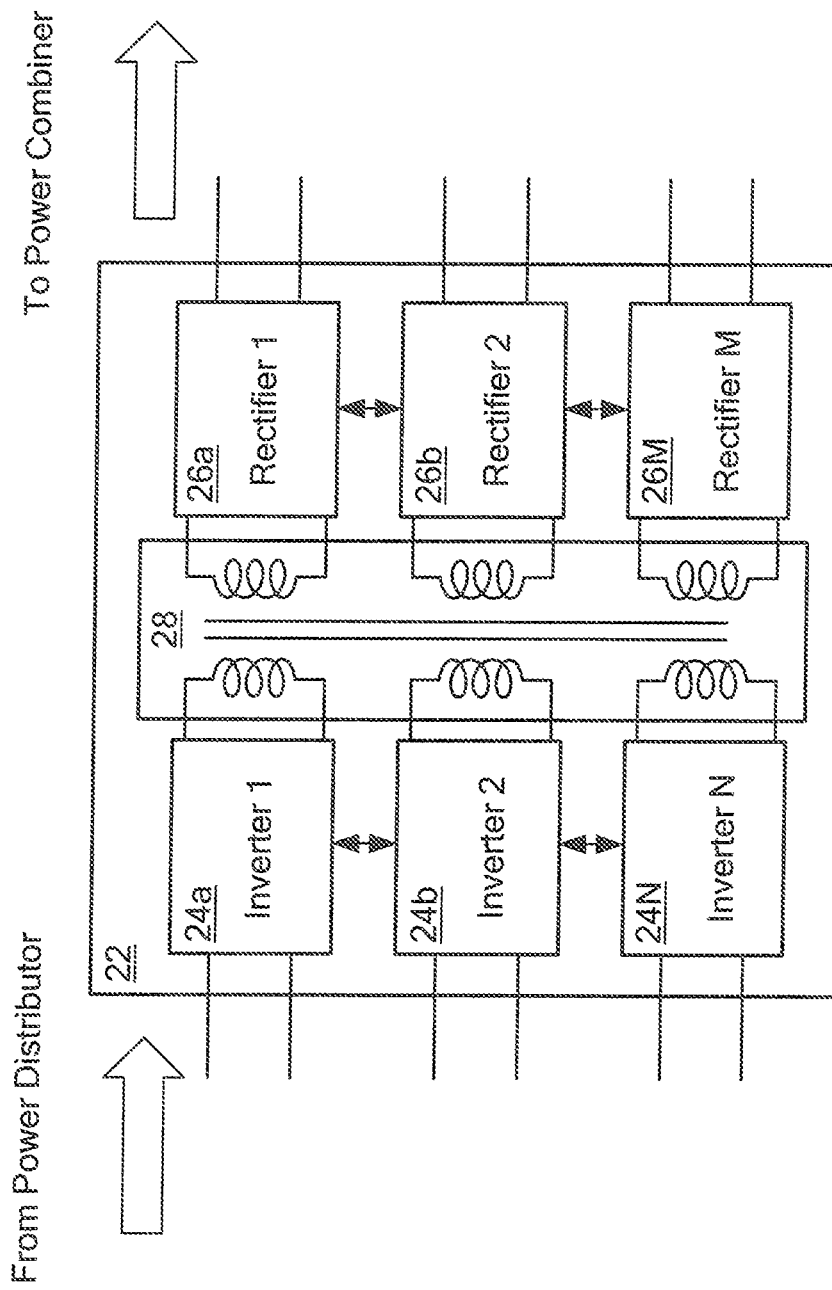
FIG. 2 is a block diagram of a coupled split path (CSP) circuit.

Referring now to FIG. 2, a CSP circuit 22 comprises N inverter cells (or more simply "inverters") 24a-24N each having a pair of inputs corresponding to inputs of the CSP circuit 16 outputs of inverters 24a-24N are coupled to corresponding ones of M rectifier cells (or more simply "rectifiers") 26a-26M through a magnetic coupling 28. Magnetic coupling 28 functions to step up/down the voltage provided thereto and provide isolation between the inverters and rectifiers. Magnetic coupling 28 is here illustrated as a transformer having a single magnetic flux linkage and N+M windings (i.e. the number of windings corresponds to the sum of the inverter and rectifier circuits). Other types of magnetic couplings may, of course, also be used. One alternative example of a magnetics coupling structure is to have multiple magnetic flux linkages and multiple windings. For example, in a magnetic core having multiple paths (or "legs"), there could be a few windings on each leg, with a particular magnetic flux linkage between the multiple legs.

Inverter cells 24 extract power from a power distributor (not shown in FIG. 2), and rectifiers 26 feed power into a power combiner (not shown in FIG. 2). There exists energy exchange and rebalance among the inverters and the rectifiers in the CSP circuit. A switched capacitor mechanism, for example, allows energy rebalancing among the inverters and the rectifiers.

It should be noted that a conventional transformer has one primary winding and one secondary winding. In a conventional planar transformer structure, windings are implemented with flat copper planes stacked close to each other, resulting in significant parasitic capacitance. It will be appreciated that transformers implemented for the purposes of the present invention can be advantageously constructed as "planar transformers", that is, provided as a printed-circuit-board (PCB) embedded transformer utilizing PCB traces as windings. This Is advantageous owing to the high control of transformer parameters that are available, and to the low-profile nature of the resulting structure.

In accordance with the CSP structure illustrated in FIG. 2, however, 28 is provided having a single magnetic flux linkage and having a number of windings selected to match the combined number of inverters and rectifiers (e.g. N+M windings in the embodiment of FIG. 2). The input/output voltage selection is made depending upon the needs of a particular application. For example, if the application requires a high voltage, then a high voltage tap is selected. On the other hand, if the application requires a low voltage, then a low voltage tap is selected. If the application requires a range of voltages, then multiple voltage taps can be selected.

Figure 3:
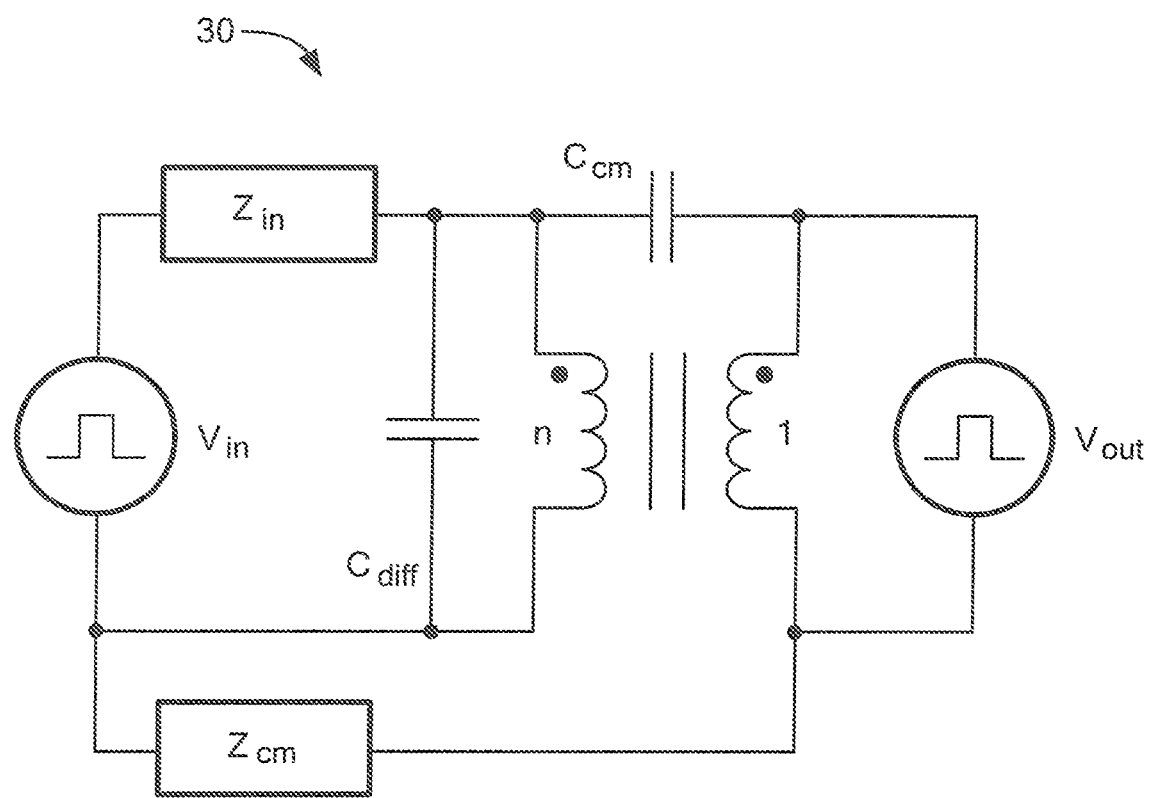
FIG. 3 is a schematic diagram of a conventional transformer structure.

Referring now to FIG. 3, a simplified lumped model of the parasitic components in a conventional transformer includes a parasitic capacitance between primary windings and secondary windings modeled as common mode capacitance ($C_{cm}$). The parasitic capacitance between two primary windings or two secondary windings is modeled as differentialmode capacitances ($C_{diff}$). These capacitances, together with impedances $Z_{in}$ and $Z_{cm}$, form a path for current to flow, which can yield loss. Moreover, the ac current flows can distort an intended voltage transformation of the converter. It should be noted that impedance $Z_{in}$ may include impedances provided as part of the distribution stage, while impedance $Z_{cm}$ may include parasitic coupling, such as through the enclosure of the power converter. As switching frequencies increase, the effects of these capacitive components become larger, and associated proximity-effect currents induce more loss.

Figure 4:
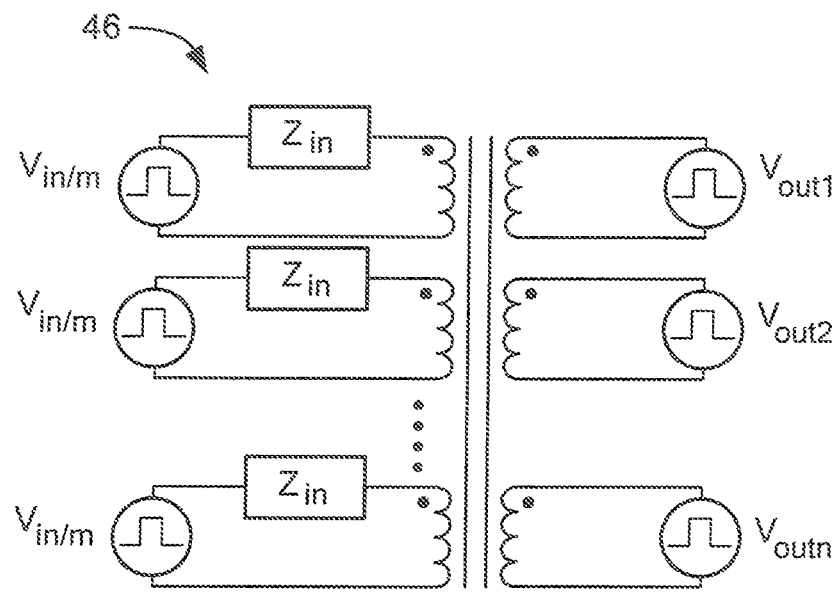
FIG. 4 is a schematic diagram representation of an analytical model of a CSP.
Figure 4A:
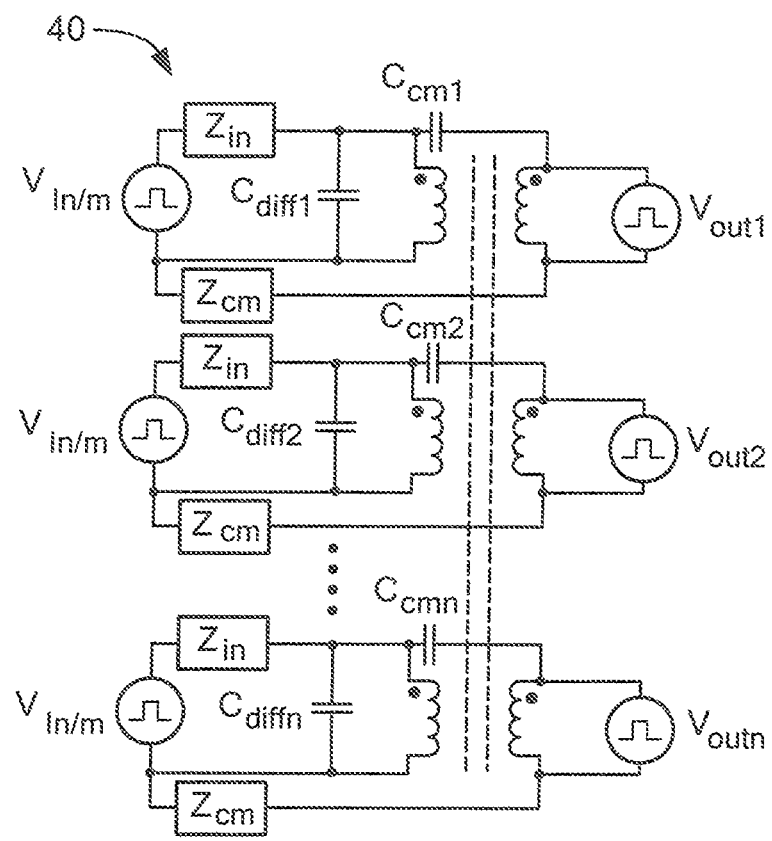
FIG. 4A is a schematic diagram representation of a parasitic capacitance model of the CSP shown in FIG. 4.

Referring now to FIGS. 4 and 4A, shown are an analytical model and a parasitic capacitance model of a CSP structure. Instead of having a single primary winding and a single secondary winding (as in conventional circuits such as that show in FIG. 3), the CSP structure has N primary-secondary winding sets, with the primary of each winding set driven by one of the N inverter outputs of the power distributor and inverter stage (e.g. outputs of inverter cells 24a-24N in FIG. 2). Each winding set is provided having an identical turns-ratio, and together they link a single dominant magnetic flux path. It should be noted that common-mode capacitances still exist in these winding-pairs, but owing to the distribution of the inverter function (e.g. via a distribution stage such as (power distributor 12 in FIG. 1), the common-mode components of the ac voltages driving currents through the capacitances are reduced, thereby reducing the current flows which in turn reduces both loss and the impact on the voltage conversion function of the transformer stage.

Figure 5:
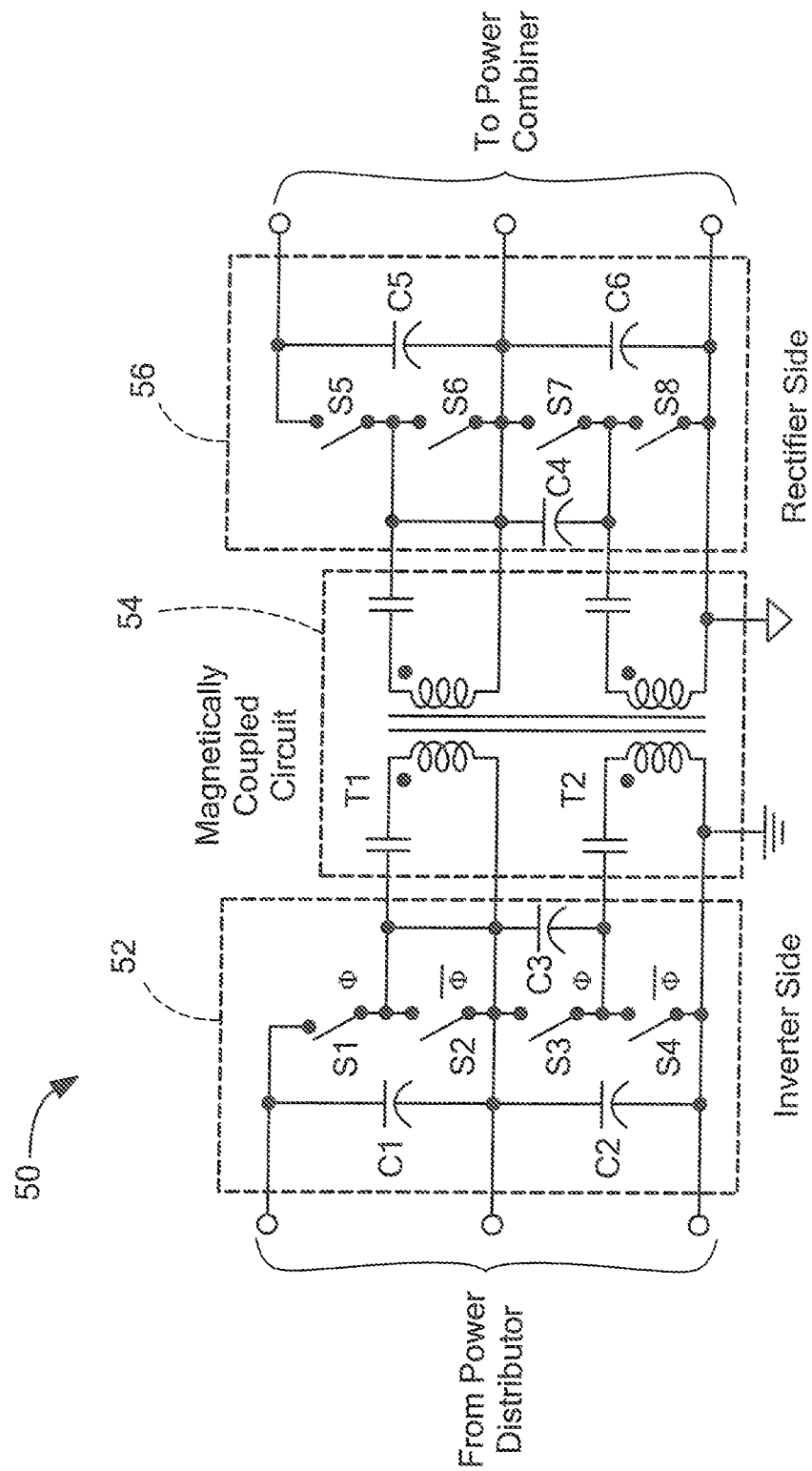
FIG. 5 is a schematic diagram of an illustrative CSP structure having a switched-capacitor coupling and two inverter-side half bridge switch pairs which are synchronously switched.

Referring now to FIG. 5, an illustrative CSP stage implementation 50 includes two switched capacitor circuits 52, 56 coupled through a magnetically coupled circuit 54. In this illustrative embodiment, magnetically coupled circuit 54 is implemented as a transformer having four windings.

Switches S1-S4 function as inverter switches, and switches S5-S8 function as rectifier switches. Thus, switches S1-S4 and capacitors C1, C2 (and C3) implement multiple inverter cells while switches S5-S8 and capacitors C5, C6 (and flying capacitor C4) implement multiple rectifier cells with the inverter and rectifier cells coupled through a magnetically coupled circuit 54. It should be noted that this illustrative implementation utilizes a switched capacitor energy coupling mechanism which utilizes the flying capacitors to provide capacitor charge transfer for voltage equalization among inverter cells. That is, the power processed by the multiple inverter/rectifier cells (i.e. respective ones of switches S1-S8 and capacitors C1-C6, as noted above) are exchanged by switched capacitors. It will be appreciated that instead of only capacitors, the inverter circuit cells may be coupled with other inverter circuit cells via series LC resonant networks to provide resonant energy transfer among the said dc voltage levels, as in a resonant switched capacitor system.

Power is delivered through the multiple split current paths with a first path provided from switches S1, S2, S5, S6 capacitors C1, C5 and transformer T1 and a second path provided from switches S3, S4, S7, S8, capacitors C2, C6 and transformer T2. It should be noted that transformers T1 and T2 share the same magnetic flux loop, and can be viewed as one single transformer with two primary windings and two secondary windings. It should also be noted that in the implementation of FIG. 5, the inverter cells are electrically connected with their input ports cascaded to form a series chain, providing a set of terminals at the inverter inputs having a set of relatively fixed voltages of increasing magnitude relative to a reference potential, via which power may be delivered into or drawn from the inverter cells.

Likewise, the rectifier cells are electrically connected with their output ports cascaded to form a series chain, providing a set of terminals at the rectifier outputs having a set of relatively fixed voltages of increasing magnitude relative to a reference potential, providing multiple paths via which power may be drawn from or delivered into the rectifier cells.

Figure 6:
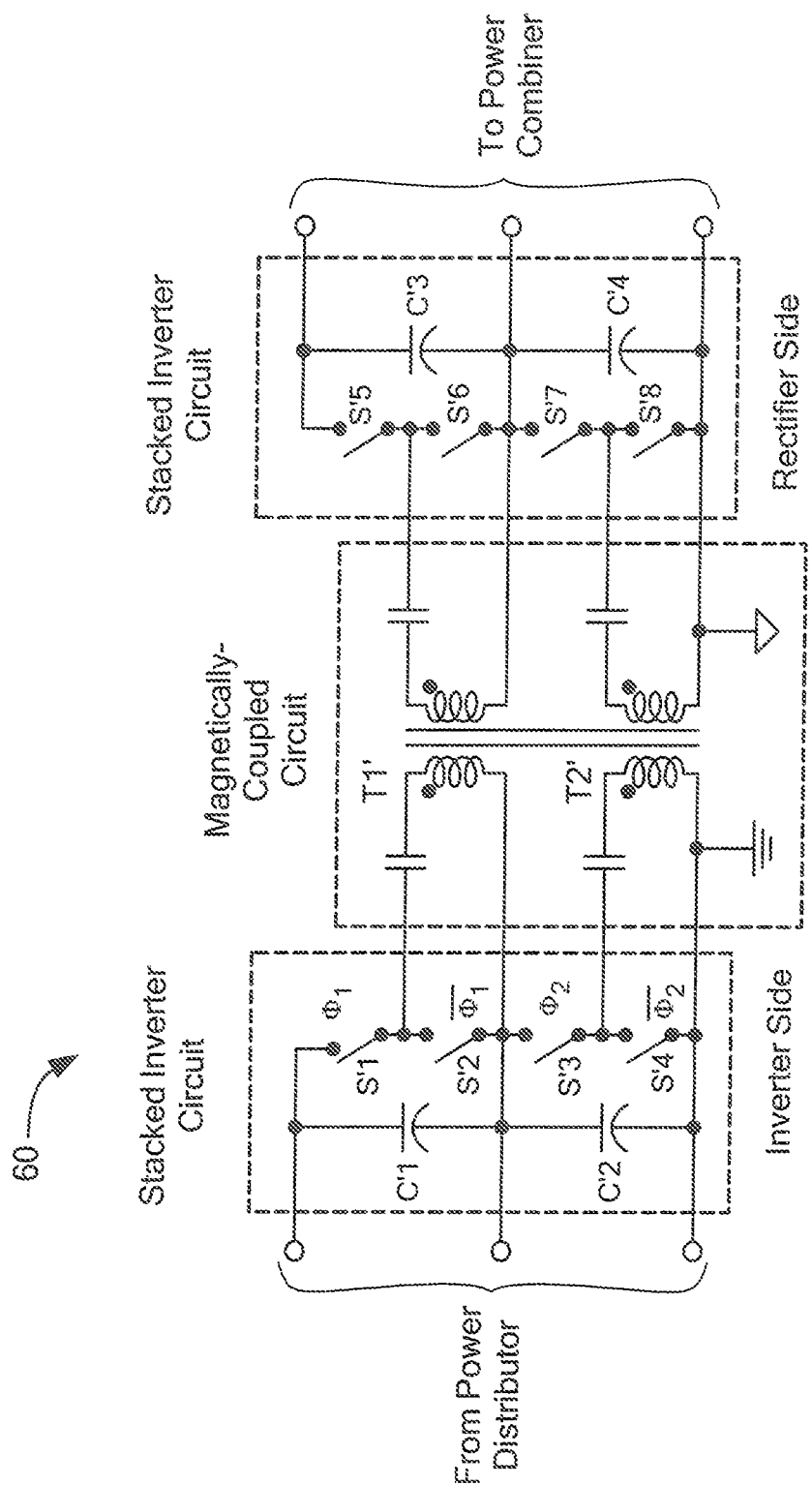
FIG. 6 is a schematic diagram of an illustrative CSP structure having phase shifted magnetic coupling and two inverter-side half bridge switch pairs which may or may not be synchronously switched.

Referring now to FIG. 6, an alternative CSP structure 60 includes a phase-shifted magnetic coupling mechanism. The inverter cells are stacked with their input ports cascaded to form a series chain, providing a set of terminals at the inverter inputs having a set of relatively fixed voltages of increasing magnitude relative to a reference potential, providing multiple paths via which power may be delivered into or drawn from the inverter cells. The flying capacitors illustrated in FIG. 5 are eliminated. The two half-bridge pairs on the transformer primary side (i.e. the inverter side) are phase shifted relative to each other ($\Phi 1$ and $\Phi 2$) so as to modulate the power that is delivered by the two split paths; this operation may leverage the leakage inductance of the transformer. If the relative phase shift is zero (i.e. $\Phi 1$ and $\Phi 2$ are in phase), the two split paths will have same voltage drop, but will not necessary deliver the same amount of power. It is also noted that power and/or output voltage may be instead or additionally controlled by phase shift between the inverter cells and the rectifier cells or by modifying switching frequency of the inverter and rectifier cells.

As noted above in conjunction with FIG. 1, a power distributor receives the overall input power and voltage from one or multiple sources, conditions it and distribute it to multiple paths to interface with the CSP stage. A power distributor is not always necessary, but is useful in most applications. An appropriate power distributor design enables the remainder part of the system (the CSP and the power combiner) to be optimized for a compressed operating range, leading to a higher efficiency of the overall system. The voltage regulation capability is also realized with the power distributor.

Figure 7:
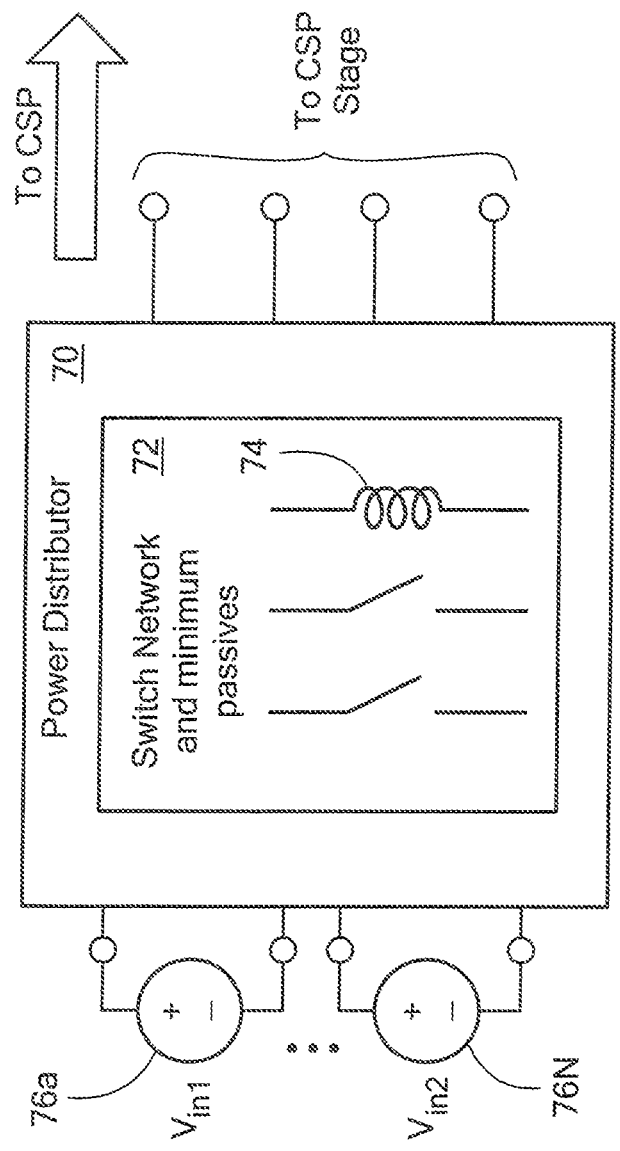
FIG. 7 is a block diagram of a power distributor.

Referring now to FIG. 7, an illustrative power distributor 70 comprises a switch network 72 having relatively few (and ideally a minimum number of) passive components 74 to realize its functions. Since in power electronics applications, bulky passive components (e.g., magnetics) can be very expensive. Thus, using a minimum number of passives can reduce the cost. The CSP system described herein allows the use of a fewer number and smaller sized passive components (e.g. inductors and capacitors) than in prior art approaches thereby resulting in a circuit having a lower cost and smaller physical volume than prior art circuits. The power distributor is configured to accept one or more input sources 76 (e.g. one or more voltage sources, with two voltage sources 76a, 76b being shown in FIG. 7), condition (i.e. modulate/regulate) the signals provided thereto and redistribute the energy provided thereto to a CSP stage (not shown in FIG. 7) so as to help satisfy "ripple" and "transient" requirements on the output. The rectifier may thus be controlled to regulate the output voltage/power. Power distributor 70 thus receives input signals provided to input ports thereof and provides multiple relatively fixed voltage levels at outputs thereof.

Figure 8:
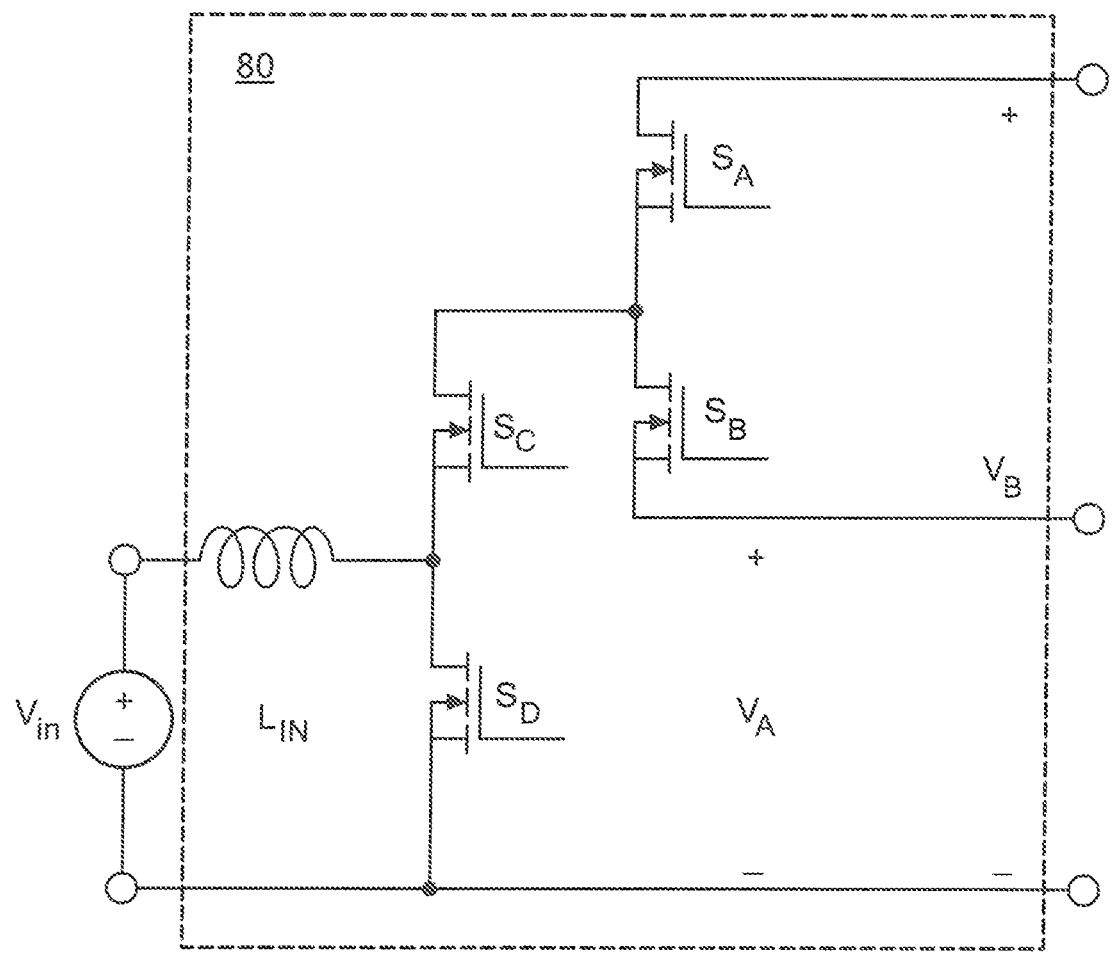
FIG. 8 is a schematic diagram of an illustrative power distributor.

Referring now to FIG. 8, an illustrative implementation of a power distributor 80 comprises one inductor $L_{IN}$ and four switching elements $S_A$, $S_B$, $S_C$, $S_D$, which are here illustrated as field effect transistor (FET) switches although any type of controllable switching element may be used. The four switches are grouped into two half-bridges. One half-bridge refers to a first reference potential (here illustrated as ground) and the other half-bridge refers to a second different reference potential (here illustrated as voltage $V_B$). This configuration allows the switches to be easily driven with half-bridge gate drive circuitry. It can be seen that the power distributer circuit comprises a first pair of switches ($S_C$ and $S_D$) that switches one end of the inductor between a reference potential and a first intermediate node, and a second pair of switches ($S_A$ and $S_B$) that switches the potential of said first intermediate node between a first output of the power distributor and a second output of the power distributor, which may correspond to a first voltage level of the inverter cells and a second voltage level of the inverter cells.

The operation of switches $S_A$, $S_B$, $S_C$, $S_D$ maintains or regulates the voltage $V_A$ and $V_B$ (e.g., to be relatively fixed). One technique for controlling or modulating the four switches $S_A$, $S_B$, $S_C$, $S_D$, for example, is to change their operation (i.e. the switching operation of the switches) in relation to the input voltage $V_{in}$. For example, when the input voltage $V_{in}$ is smaller than voltage $V_A$, switch $S_A$ is kept off (e.g. switch $S_A$ is biased into its non conduction state), switch $S_B$ (e.g. switch $S_B$ is biased into its conduction state) is kept on, and switch $S_C$ and $S_D$ are switched in a complementary manner to regulate $V_A$ and/or $V_B$. When the input voltage is higher than voltage $V_A$ and smaller than voltage $V_B$, switch $S_C$ is kept on, switch $S_D$ is kept off, and switches $S_A$ and $S_B$ are switched in a complementary manner to regulate $V_A$ and/or $V_B$. PWM operation, including quasi-square-wave resonant operation or resonant pole operation can be adopted. Such modes include use of the parasitic switch capacitances and bidirectional flow of the inductor current within a switching cycle to provide zero-voltage-switching (ZVS) or near ZVS soft switching operation of the switches in the power distribution circuit along with a very small inductor Lin. Moreover the switching of the switches can also be used to shape the local average input current waveform drawn by the power distributor (e.g., over a cycle of a time-varying input voltage).

The illustrative power distributor structure of FIG. 8 offers the advantage of lower device voltage rating. In this particular example, switches $S_A$ and $S_B$ have a voltage rating of $V_B$-$V_A$. Switch $S_C$ has a voltage rating of $V_A$ and Switch $S_D$ has a voltage rating of $V_B$. As noted above, although switches $S_A$, $S_B$, $S_C$, $S_D$, are illustrated as FETs, any type of controllable switching element may be used to implement one or more of switches $S_A$, $S_B$, $S_C$, $S_D$. For example, it should be appreciated that switches $S_A$ and $S_C$ can be replaced with diodes to eliminate the requirement of high side floating switches in the half bridge.

As noted above in conjunction with FIG. 1, a power combiner collects energy from multiple paths of a CSP, and manipulates the energy into a format that can interface with one or more output loads. This means that the power combiner may create multiple different output voltages at the same time (e.g. 5V, 10V, 15V, 20V, etc). In many applications (e.g. in telecom server motherboards) multiple voltage levels are needed. In some applications, the power combiner may be omitted by appropriately selecting a CSP output structure (e.g. such that the number of CSP outputs matches the number of outputs the system requires). In applications where the number of outputs of the CSP does not equal to the number of outputs that the system requires, however, a power combiner is generally necessary to achieve desired circuit operation.

Figure 9:
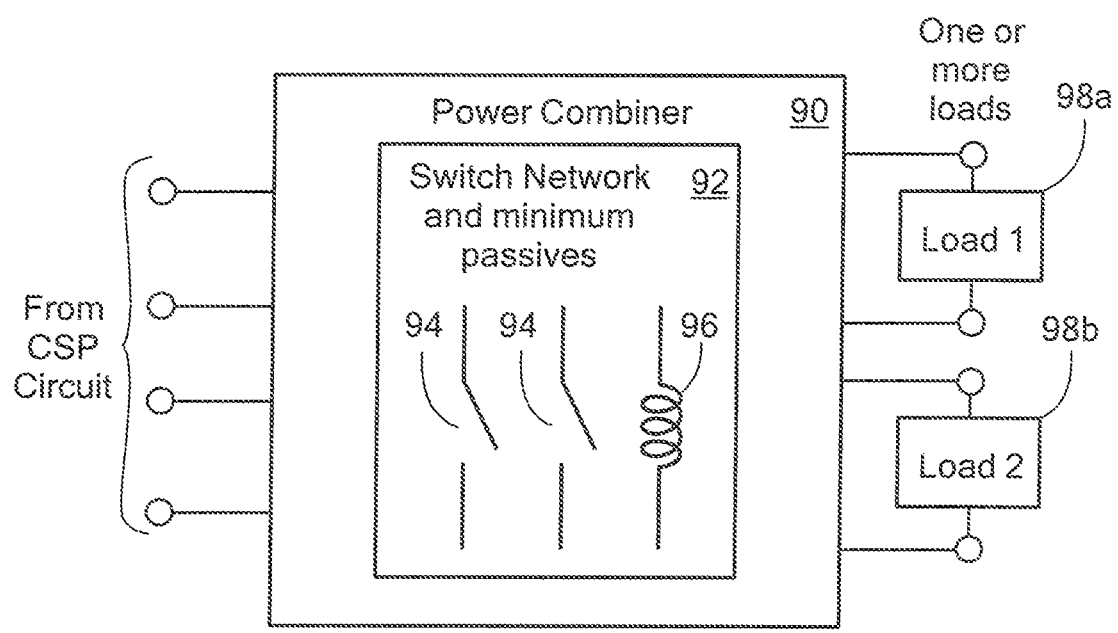
FIG. 9 is a block diagram of a power combiner.

Referring now to FIG. 9, a power combiner stage 90 comprises a switch circuit 92 provided from one or more switches 94 and as few (and ideally) a minimum number of) passive components 96 required to realize its power combining functions. Power combiner stage 90 sources power from multiple voltage taps of a CSP circuit (not shown in FIG. 9) and provides power to one or more loads with two loads 88a, 88b being shown in this particular example.

Figure 10:
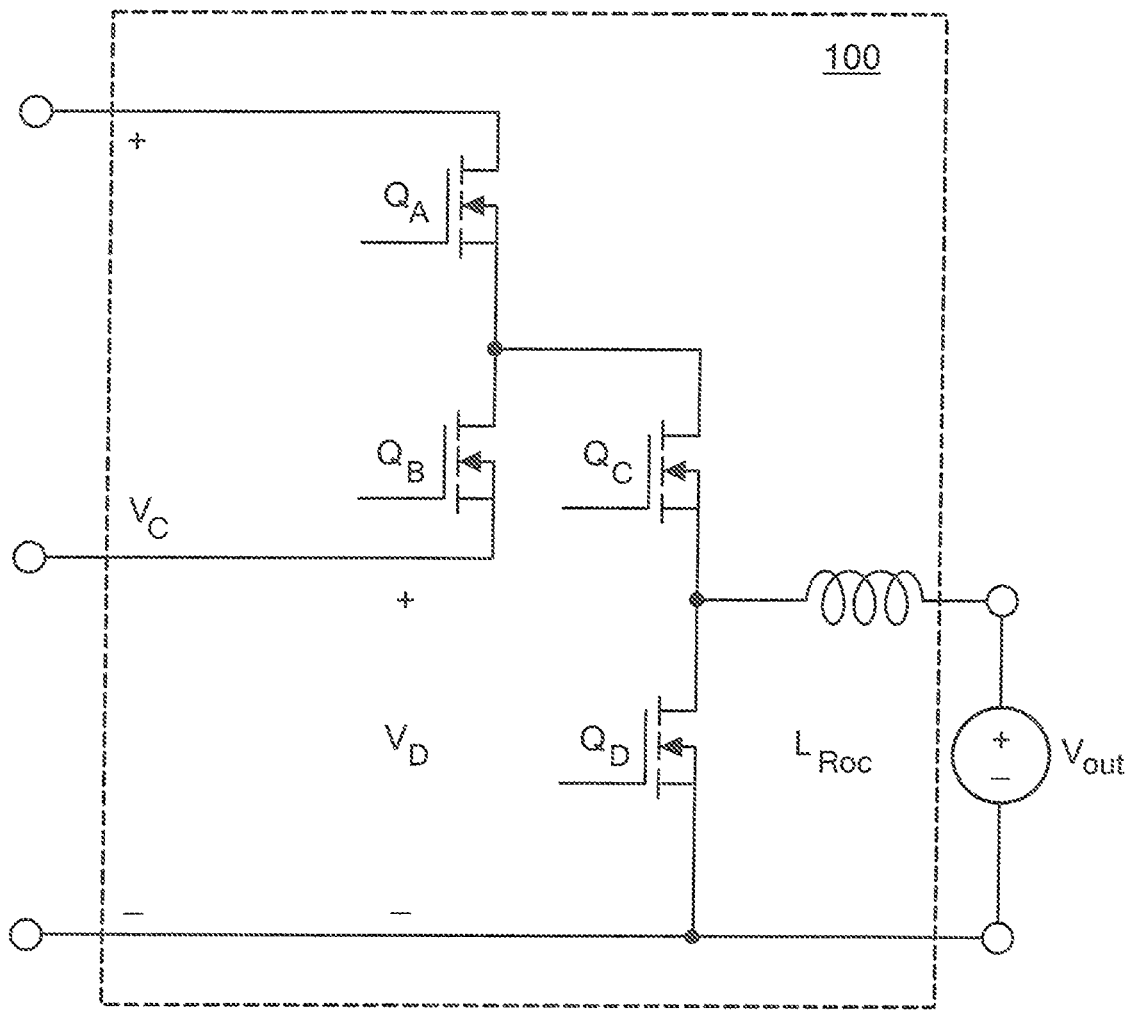
FIG. 10 is a schematic diagram of an illustrative power combiner.

Referring now to FIG. 10, an illustrative structure for a power combiner 100 that may be suitable for use in applications requiring a wide output voltage range comprises one inductor $L_{Rac}$ and four switches $Q_A$, $Q_B$, $Q_C$, $Q_D$. The illustrative power combiner 100 receives two input voltage, $V_C$ and $V_D$ provided from the outputs of a CSP (not shown in FIG. 10). In operation, switches $Q_A$, $Q_B$, $Q_C$, $Q_D$ function to ideally maintain an output voltage of $V_{OUT}$ at output ports of the power combiner 100. The illustrative power combiner 100 is capable of producing any voltage between ground and $V_C$ and can also be driven by dc-voltage referenced half-bridge drivers. Similar to the switches in the power distributor described above in conjunction with FIG. 8, power combiner switches $Q_A$, $Q_B$, $Q_C$ and $Q_D$ are provided having reduced and different voltage ratings. In particular, switches $Q_A$ and $Q_B$ need to block $V_C$-$V_D$; switch $Q_C$ needs to block $V_C$; and switch $Q_D$ needs to block $V_D$.

Figure 11:
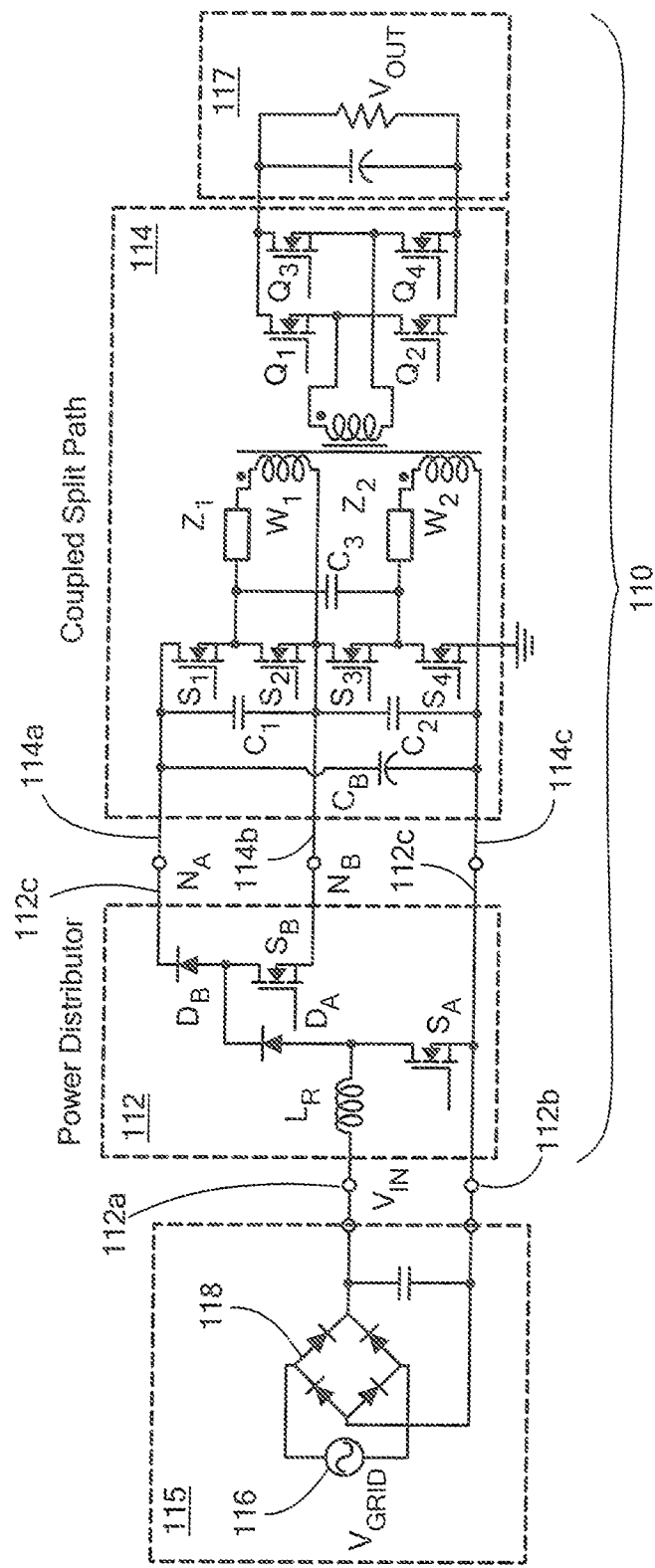
FIG. 11 is a schematic diagram of an illustrative ac-dc converter having a CSP architecture with a switched-capacitor energy coupling mechanism.

Referring now to FIG. 11, a power converter circuit 110 having a coupled split path architecture well suited to ac-dc power factor correction (PFC) circuit applications includes a power distributor circuit 112 and a CSP circuit 114. An input source 115 (not properly a port of power converter circuit 110) is provided as an ac voltage source 116, here illustrated as grid voltage $V_{GRID}$, coupled through a full bridge rectifier circuit 118 to provide an input voltage $V_{IN}$ to inputs 112a, 112b of a power distributor circuit 112. Thus, in this illustrative embodiment, power distributor circuit 112 is configured to receive an input voltage $V_{IN}$ originated from an ac source. In turn, power distributor circuit 112 processes the signals provided thereto and provides output signals via outputs 112c, 112d, 112e to inputs 114a, 114b, and 114c of CSP circuit 114.

It should be noted that since CSP structure 114 has a single output, and the overall system only needs one output 117, a power combiner circuit is not needed. The voltage of the ac electric grid, $V_{GRID}$, is rectified by a full bridge diode rectifier 118 and becomes a unipolar voltage $V_{IN}$ that has a wide range. The voltage $V_{IN}$ serves as the input voltage of the power distributor 112. The power distributor comprises one inductor $L_R$, two switches $S_A$, $S_B$ and two diodes $D_A$, $D_B$. The two diodes $D_A$, $D_B$ can be replaced by two switches to reduce the loss. The two switches and two diodes may be operated in a way such that the voltage at the two nodes $N_A$ and $N_B$ are regulated to be relatively fixed as the input voltage changes, and may also be operated in a way to draw current from the grid at high power factor.

If the input voltage $V_{IN}$ is smaller than the voltage at node $N_B$ (i.e. voltage $V_B$), switch $S_B$ is kept on, and switch $S_A$ is switching. Inductor $L_R$, switch $S_A$ and diode $D_A$ function as a boost converter, which feeds current into node $N_B$. A switched capacitor energy coupling mechanism of switches $S_1$, $S_2$, $S_3$ and $S_4$ maintains the voltage of node $N_A$ ($V_A$) approximately equal to $2V_B$.

If input voltage $V_{IN}$ is larger than the voltage at node $N_B$ ($V_B$), switch $S_A$ is kept on, and switch $S_B$ is switching. Inductor $L_R$, switch $S_B$ and diode $D_B$ function as a switched inductor converter that feeds current into both node $N_A$ and node $N_B$.

A third operation mode is to keep switch $S_B$ off and only switch $S_A$. In this mode, energy is directly feed into node $N_A$. As will be explained, appropriate combination of these three modes can enable soft switching of switches $S_A$ or $S_B$ across a wide input voltage range, which can reduce the loss of the converter at high switching frequencies (i.e. at switching frequencies at which parasitic effects may have an impact on circuit performance). It should be appreciated that the particular frequency would depend upon the power level. For example, in 100 W-1 kW power range applications and/or at tens to hundreds of volts, a frequency above 1 MHz may be considered high.

Node $N_A$ and node $N_B$ link the power distributor and CSP together. In this illustrative implementation, the CSP circuit includes one energy buffer capacitor $C_B$, two decoupling capacitors $C_1$ and $C_2$, four switches $S_1$, $S_2$, $S_3$, $S_4$, one flying capacitor $C_3$, two impedances $Z_1$, $Z_2$, two primary windings $W_1$, $W_2$, one secondary winding $W_3$, and four rectifier switches $Q_1$, $Q_2$, $Q_3$, $Q_4$. Switches $Q_1$, $Q_2$, $Q_3$, $Q_4$ are operated as full-bridge rectifiers and produce an output voltage of $V_{OUT}$ at outputs of CSP 114.

A twice-line-frequency energy buffering capacitor $C_B$ which also supports the hold-up time, is connected between node $N_A$ and a reference potential (here the reference potential corresponding to ground). The twice-line-frequency energy buffering capacitor is not necessary in dc-dc applications, but is necessary in ac-dc applications which require high power factor. This capacitor absorbs the instantaneous difference in energy between that drawn from the ac input at high power factor and that provided to the converter output, so has an energy storage rating that is associated with twice the line frequency. This capacitor may also store additional energy for "holdup" to transiently supply the output if the input voltage temporarily drops out, and may be typically implemented as an electrolytic capacitor. The energy buffer capacitor may be placed across any subset of the inverters. However, is advantageously placed from the highest potential of the set of inverter cells to the lowest potential (i.e., across the full voltage across the series chain connection of the inverter cell inputs) in order to take advantage of the superior energy density and cost tradeoffs provided by high-voltage electrolytic capacitors (e.g., 400 V or 450 V electrolytic capacitors).

It should be appreciated that the two split paths can be implemented using a variety of different isolated topologies including, but not limited to resonant converters, forward converters, dual-active-bridge converters, etc. The converter output voltage may be regulated by one or more of frequency control, phase-shift control between inverters and rectifiers, phase shift control among inverter cells, on/off or burst-mode control and pulse-width modulation of the inverter and/or rectifier cells.

The rectifier structure may also be implemented using a variety of different topologies including, but not limited to full bridge rectifiers, half bridge rectifiers, current doubler rectifiers, and center-tapped rectifiers.

Additional capacitors can be added in parallel with diode and switches $D_A$ $S_A$, $D_B$, and $S_B$ to formulate appropriate capacitance dividing ratios to enable a wide zero voltage switching (ZVS) range of the power distributor switches $S_A$, $S_B$.

It should also be appreciated that this CSP implementation utilizes switched capacitor energy coupling. As a result, switches $S_1$ and $S_3$ have the same switching action, and switches $S_2$ and $S_4$ have the same switching action. Switches $S_1/S_3$ and $S_2/S_4$ are switched in complementary fashion with each other. This operation ensures that the voltage of capacitors $C_1$, $C_2$ and $C_3$ are kept approximately constant across the line cycle. If impedances $Z_1$ and $Z_2$ are substantially identical, the two split paths deliver a substantially identical amount of power. Since the input and output voltage of the CSP stage are relatively fixed, as the line voltage change across one line cycle, the operation mode (e.g. switching actions, current waveform shapes) of the CSP stage is relatively fixed. This allows the CSP stage to maintain high performance across wide operation range.

Switches $S_A$ and $S_B$ can achieve zero-voltage-switching through a quasi-square-wave (QSW) ZVS mechanism across a wide range of input voltages. When the input voltage $V_{IN}$ is smaller than a value corresponding to a voltage of $V_B/2$ (e.g. the voltage of $C_B$ in FIG. 11), switch $S_B$ is kept on and switch $S_A$ is switching. This allows ZVS of switch $S_A$ in this range. When the input voltage $V_{IN}$ is larger than a value corresponding to a voltage of $V_B/2$, but smaller than voltage $V_B$, switch $S_B$ is kept off and switch $S_A$ is switching. This allows ZVS of switch $S_A$ in this voltage range. When the input voltage is larger than a value corresponding to a voltage of $V_B$, switch $S_A$ is kept off and switch $S_B$ is switching. This allows ZVS of switch $S_B$ in this range. When the input voltage is larger than a voltage corresponding to a voltage of $3/2V_B$, but smaller than a voltage corresponding to a voltage of $V_A$, ZVS on switch $S_A$ or on switch $S_B$ is lost.

Next described are additional illustrative embodiments of CSP converters that may be suitable for use in ac-dc applications.

Figure 12:
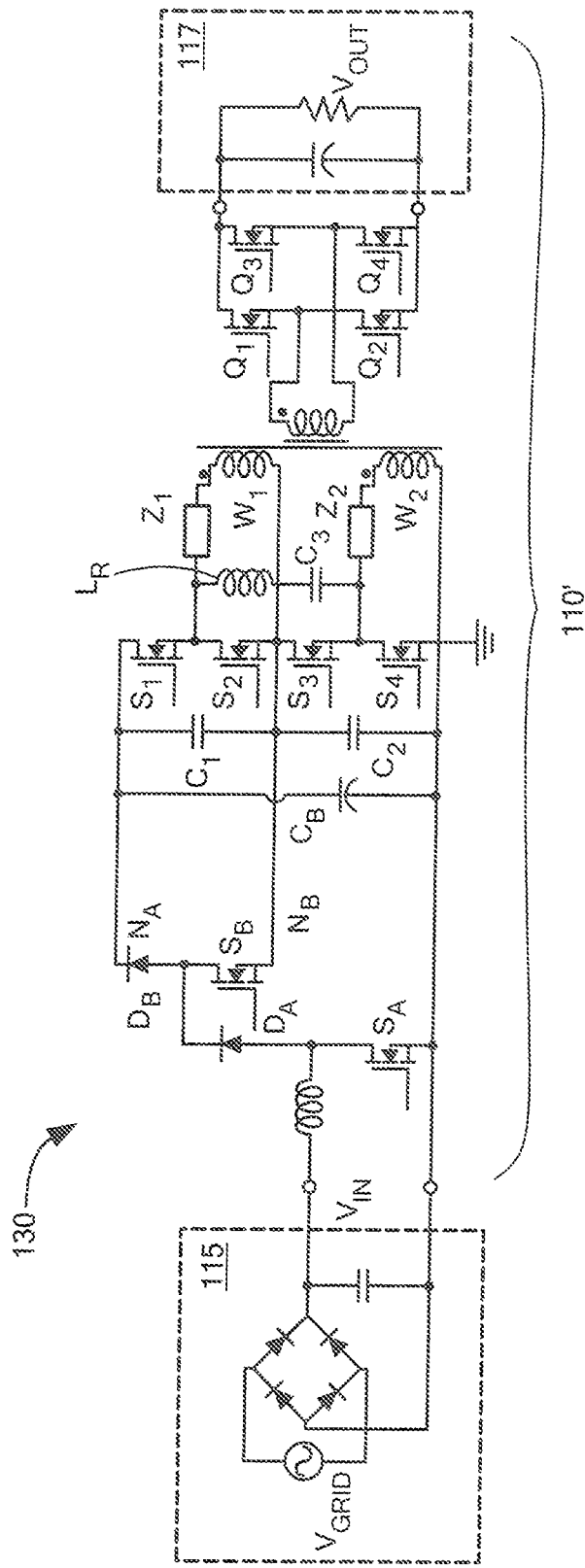
FIG. 12 is a schematic diagram of an illustrative CSP based ac-dc converter having resonant switched capacitor energy coupling.

Referring now to FIG. 12, in which like elements of FIG. 11 are provided having like reference designations, an example CSP based ac-dc converter 110' is implemented utilizing resonant switched capacitor energy coupling. Compared to the CSP circuit 110 shown and described above in conjunction with FIG. 11, the topology of CSP circuit 110' illustrated in FIG. 12 has one additional inductor $L_R$, which is coupled in series with capacitor $C_3$ to enable resonant switched capacitor operation.

Figure 13:
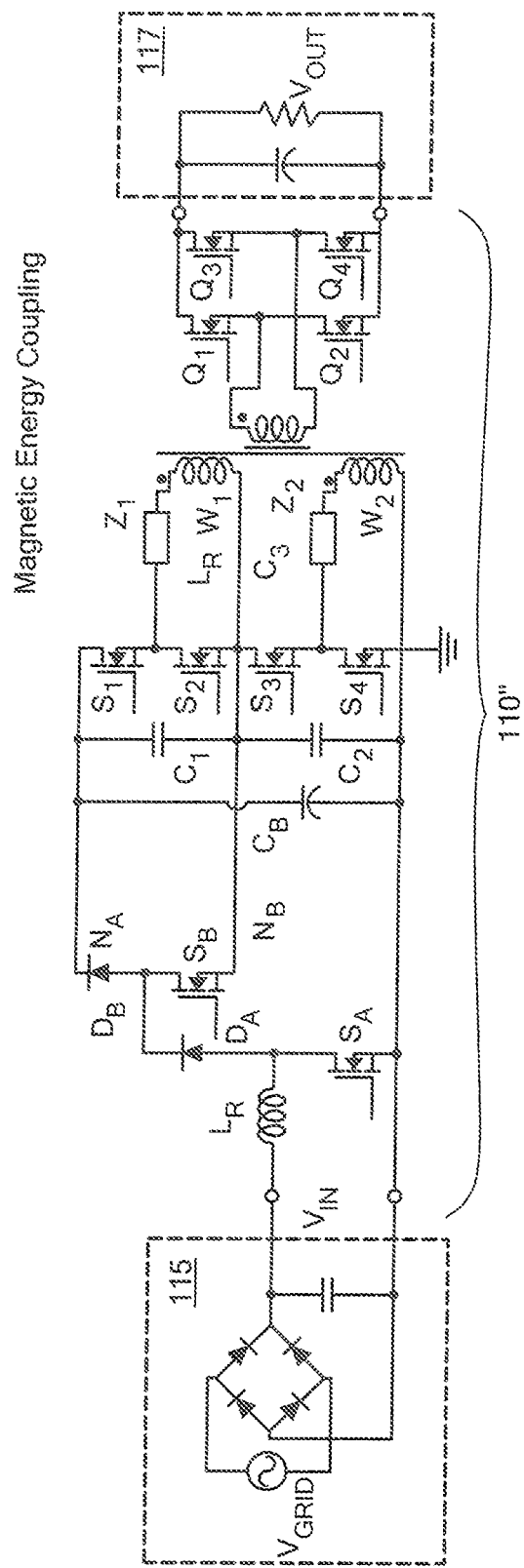
FIG. 13 is a schematic diagram of an illustrative CSP based ac-dc converter having magnetic coupling.

Referring now to FIG. 13, in which like elements of FIGS. 11 and 12 are provided having like reference designations, an illustrative CSP based ac-dc converter 110" includes a plurality of paths, here two paths, with magnetic coupling there between.

Compared to the circuit of FIG. 11, the topology of the CSP circuit 110" illustrated in FIG. 13 does not have the switched capacitor flying capacitor $C_3$. Energy coupling is achieved with phase shifted magnetic coupling. It should be appreciated that the multiple paths have the same voltage distribution, but may not necessarily share the same current. Switches $S_1$, $S_2$, $S_3$, $S_4$ need to be asynchronously switched (i.e. such that there are phase shifts between the switch timing of the multiple switches) to modulate the energy delivered by the paths.

Figure 14:
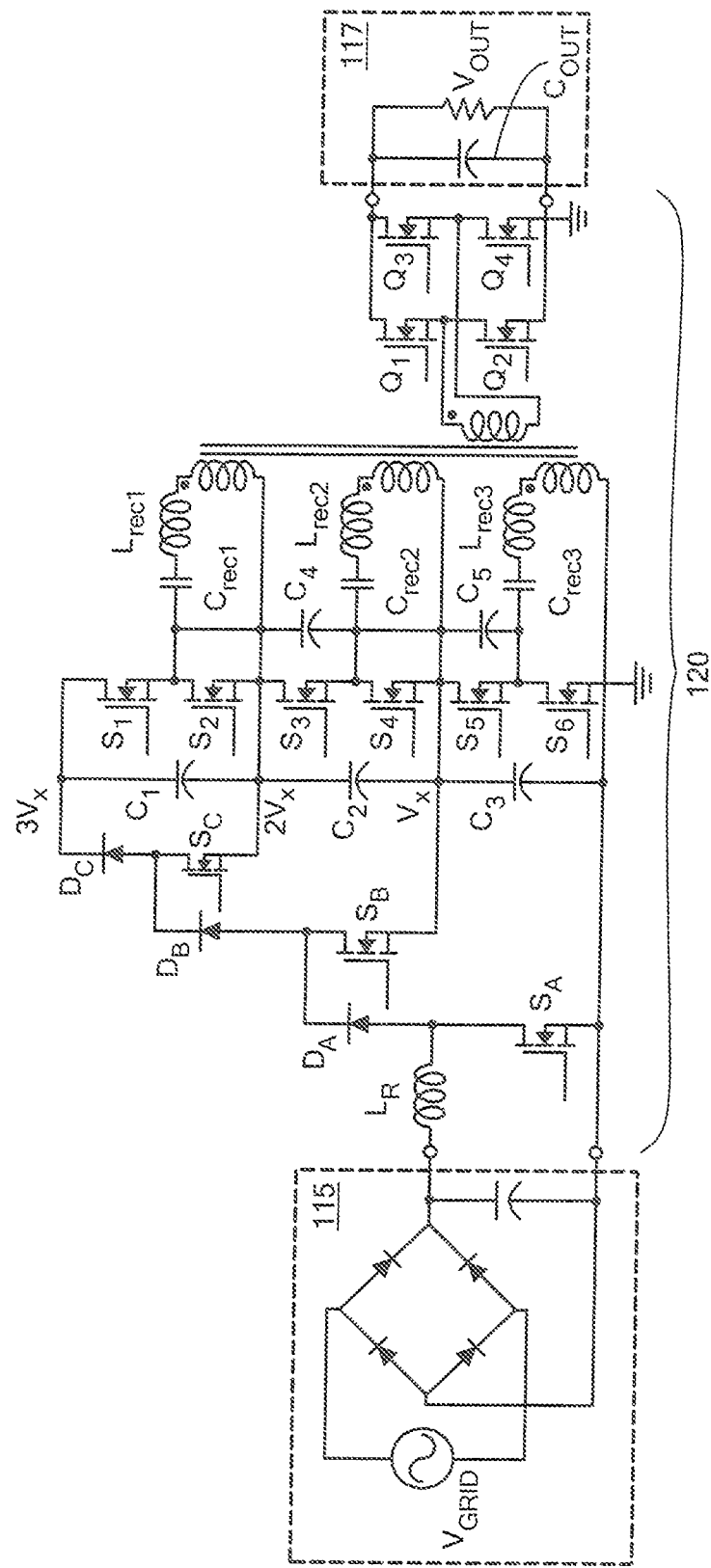
FIG. 14 is a schematic diagram of an illustrative CSP based ac-dc converter having three paths and switched capacitor coupling.

Referring now to FIG. 14, in which like elements of FIGS. 11, 12 and 13 are provided having like reference designations, an illustrative CSP based ac-dc converter 120 includes three paths and switched capacitor coupling between the paths. This implementation can further reduce the switch voltage rating, the size of inductor $L_R$, and the common-mode current injection.

Figure 15:
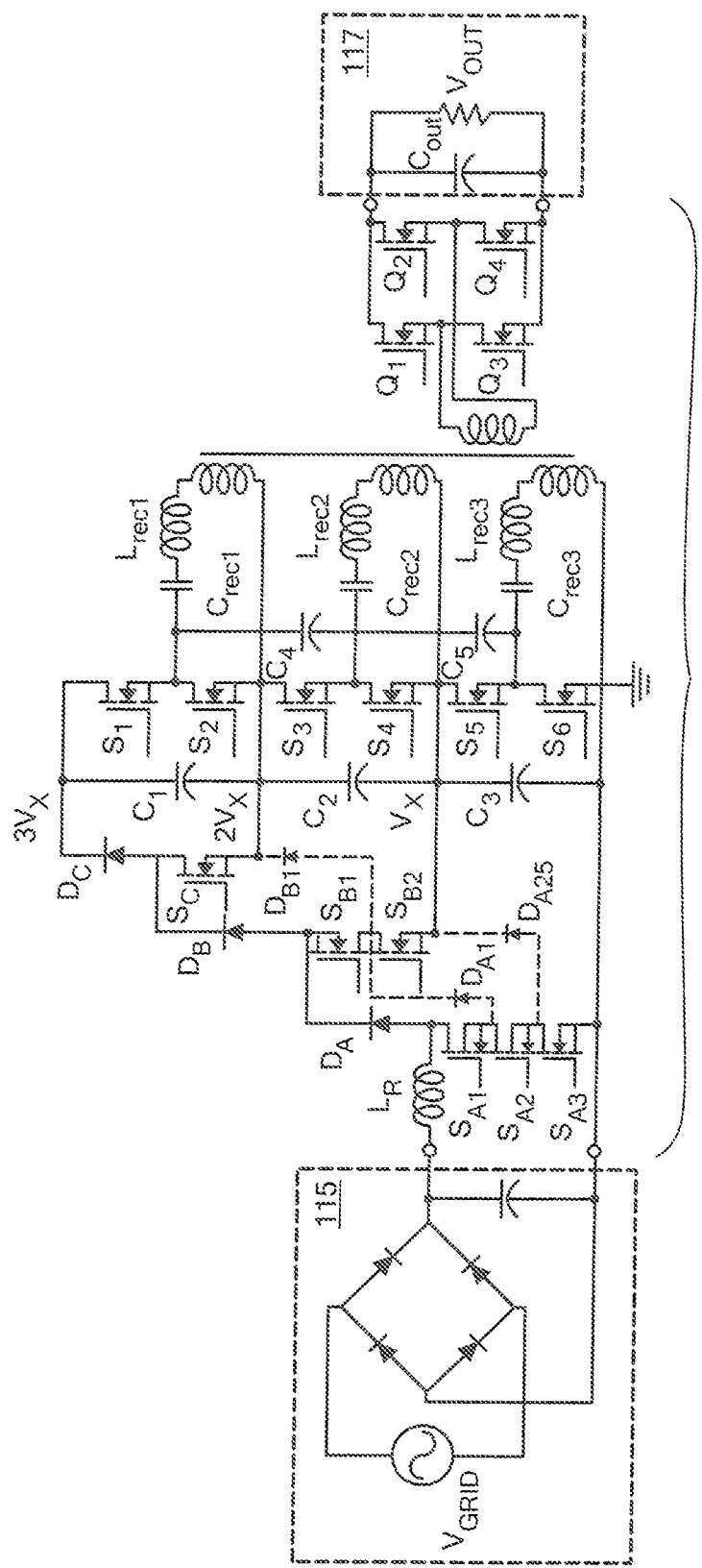
FIG. 15 is a schematic diagram of an illustrative CSP based ac-dc converter having three paths and switched capacitor coupling.

Referring now to FIG. 15, in which like elements of FIGS. 11, and 12-14 are provided having like reference designations, an illustrative CSP based ac-dc converter includes three paths and switched capacitor coupling between the paths. In this implementation, it is preferable that all primary switches and diodes have substantially identical voltage rating.

Figure 16:
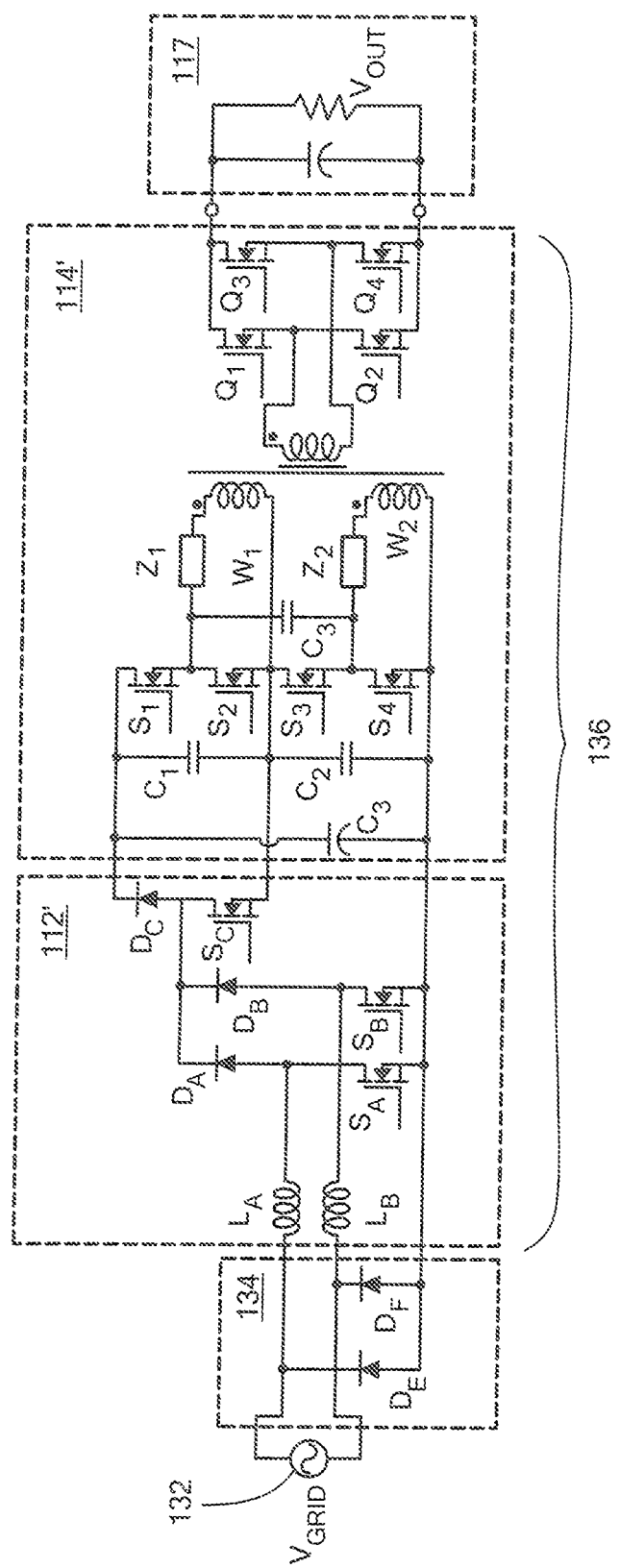
FIG. 16 is a schematic diagram of an illustrative CSP based ac-dc converter having a bridgeless power factor correction stage.

Referring now to FIG. 16, in which like elements of FIGS. 11 and 12-15 are provided having like reference designations, an AC source 132 is coupled through a bridgeless power factor correction stage (provided from elements 112' and 134) to an input of an illustrative CSP based ac-dc converter 136. The inductors and switches of the power distributor 112' act to both provide power distribution and provide bridgeless power factor correction rectification. Such a stage can reduce a diode forward voltage drop loss in an embodiment such as that shown and described above in conjunction with FIG. 11. It should be recognized that the return diodes in the bridgeless PFC stage connected to ac source 132 may be optionally omitted. Moreover, it should be noted that the magnetic components shown as part of 112' may be realized as separate inductors with windings on separate cores, separate inductors formed on a single core structure, or may be coupled inductors.

Figure 17:
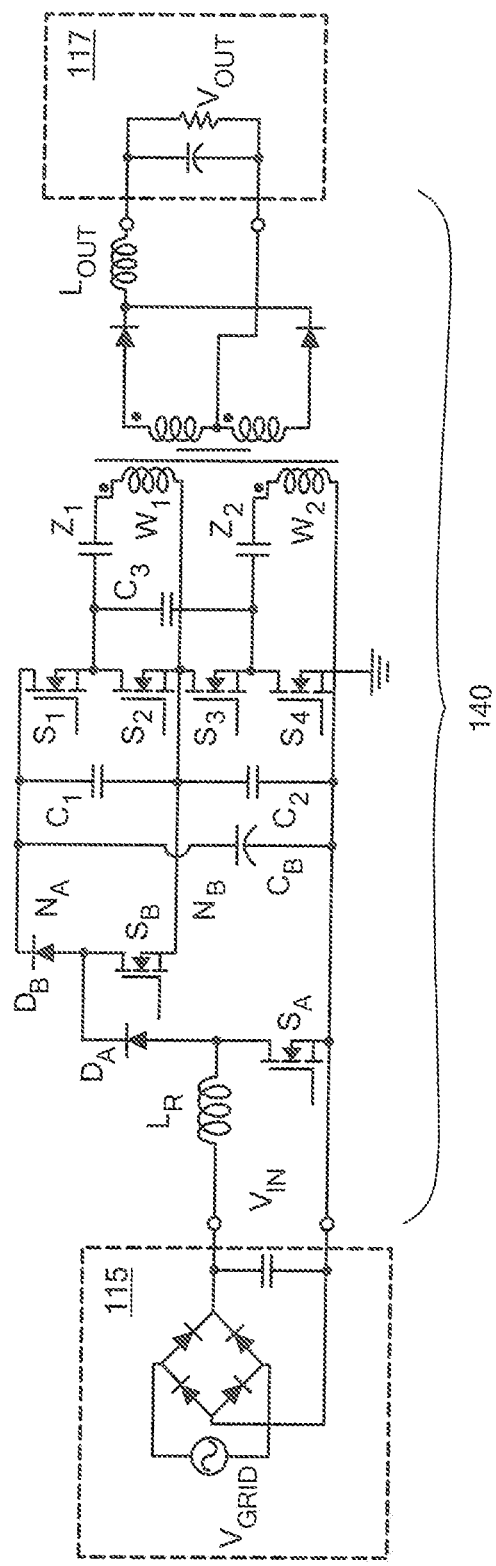
FIG. 17 is a schematic diagram of an illustrative CSP based ac-dc converter having split paths implemented as forward converters.

Referring now to FIG. 17, in which like elements of FIGS. 11 and 12-16 are provided having like reference designations, an illustrative CSP based ac-dc converter 140 has a plurality of split paths implemented as forward converters.

This embodiment has less rectifier switches, has no resonant tank and has an output inductor than the implementation described above in conjunction with FIG. 11.

Figure 18:
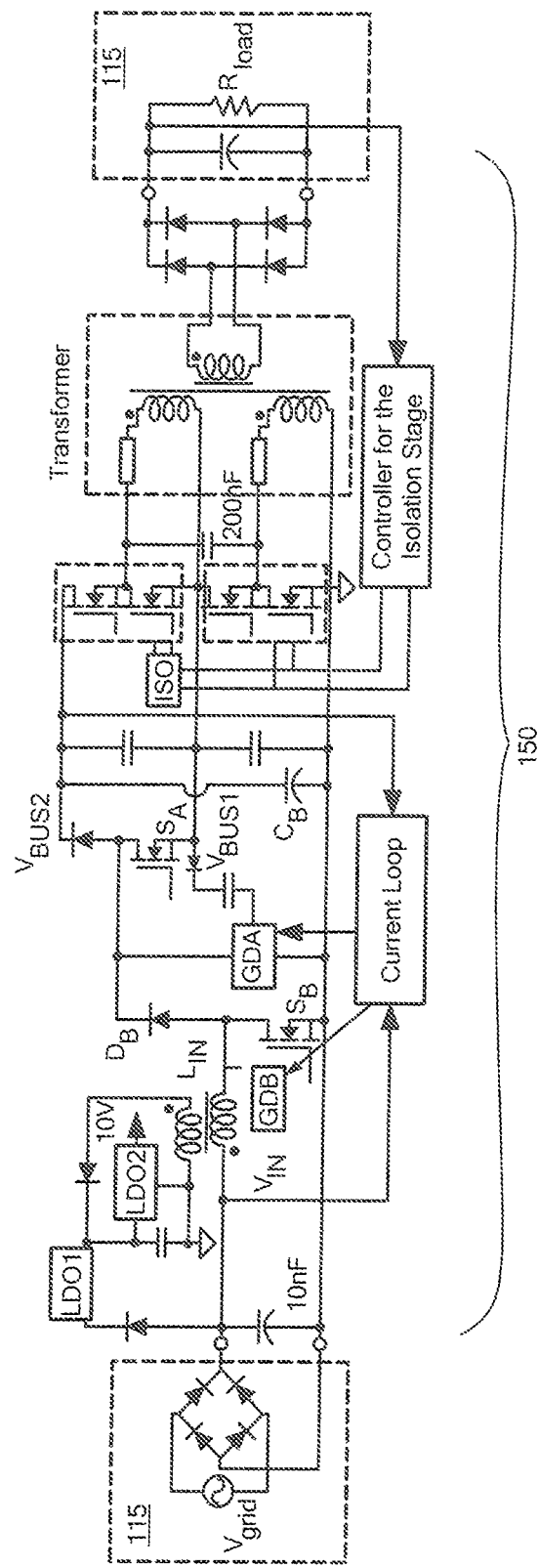
FIG. 18 is a schematic diagram of an illustrative CSP based ac-dc converter having an auxiliary control circuitry.

Referring now to FIG. 18, in which like elements of FIGS. 11 and 12-17 are provided having like reference designations, an illustrative CSP based ac-dc converter 150 coupled between an ac source 115 and a load 117, includes a startup circuit (comprising LDO1, LDO2, and an extra winding in the inductor), control circuitry for switches $S_A$ and $S_B$ (GDA, GDB, and a current loop), and a controller for the isolation stage. The controller for the isolation stage will regulate the output voltage (the voltage on $R_{load}$). The control circuitry for switches $S_A$ and $S_B$ will shape the input current, and maintain a relatively constant voltage across capacitor $C_B$. It should be appreciated that, in this illustrative embodiment, the power stage of the CSP based ac-dc converter 150 is provided having substantially the same configuration and operating characteristics as the power stage embodiment described above in conjunction with FIG. 11.

Having described preferred embodiments which serve to illustrate various concepts, structures and techniques which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A power converter circuit for use in AC/DC power factor correction (PFC) applications, said power converter circuit comprising:
    a rectifier circuit configured to receive an AC signal and output a DC signal; and
    a coupled split path (CSP) voltage converter having a plurality of input ports and a plurality of output ports, the CSP voltage converter comprising:
        a set of inverter cells that are electrically coupled with their input ports cascaded to form a series chain to provide a set of terminals at the inverter cell input ports forming a set of N voltage levels of increasing magnitude relative to a reference potential, the set of N voltage levels defining a set of voltage domains;
        an energy buffer capacitor coupled to two nodes of the inverter circuit cells;
        a power distributor circuit having an input and a set of outputs, said power distributor circuit comprising an inductor and a switch network and arranged such that said power distributor circuit operates to draw power from its input and deliver power via its outputs into at least two of the N voltage levels at the inverter cell input ports;
        a transformer having at least three windings, said transformer disposed such that each inverter cell drives a transformer winding;
        and one or more rectifier circuit cells each having an output port and an input coupled to a transformer winding.

2. The coupled split path voltage converter of claim 1, wherein:
    the set of terminals at the inverter inputs form N=2 voltage levels, said voltage levels providing input voltages to said inverters.

3. The coupled split path voltage converter of claim 2 wherein:
    the power distributor circuit further comprises two pairs of switches, each pair in a half-bridge configuration, said switches operating to switch one end of the inductor between a reference potential, a first voltage level of the inverter cells, and a second voltage level of the inverter cells.

4. The coupled split path voltage converter of claim 3 wherein: at least one switch of said power distributor circuit comprises a diode.

5. The coupled split path voltage converter of claim 2 wherein:
    each of said plurality of inverter circuit cells is coupled with another inverter circuit cell via a flying capacitor to provide capacitor charge transfer for voltage equalization among inverter cells; and
    power transferred among the inverter and rectifier cells are exchanged by a combination of capacitive energy transfer via flying capacitors and magnetic energy transfer via the transformer.

6. The coupled split path voltage converter of claim 4, wherein:
    the power distributor is controlled over an ac line cycle to draw energy from the ac voltage at high power factor.

7. The coupled split path voltage converter of claim 6, wherein:
    the power distributor further comprises a second inductor or an additional inductor winding to form a coupled inductor; and
    switches of the power distributor are further configured to operate to also provide bridgeless power factor correction rectification.

8. The apparatus recited in claim 1, wherein:
    each of said plurality of inverter circuit cells is coupled with another inverter circuit cell via a flying capacitor to provide capacitor charge transfer for voltage equalization among inverter cells; and
    power transferred among the inverter and rectifier cells are exchanged by a combination of capacitive energy transfer via flying capacitors and magnetic energy transfer via the said multi-winding transformer.

9. The apparatus recited in claim 8, wherein:
    at least one end of the inductor in said power distributor circuit is dynamically switched among two or more of said N dc voltage levels.

10. The apparatus recited in claim 8, wherein:
    said power distributor circuit comprises at least two switches configured as a half-bridge; and
    the two switches are controlled by pulse-wide-modulated (PWM) signals to regulate the voltage of one or more of said voltage levels.

11. The apparatus recited in claim 10, wherein:
said converter comprises exactly two inverter cells and at least one rectifier cell.

12. The apparatus recited in claim 11, wherein
said transformer is provided as a printed-circuit-board (PCB) embedded transformer implemented in a printed circuit board.

13. The apparatus recited in claim 11, wherein the current of the inductor is made bidirectional within a switching cycle to provide zero-voltage-switching (ZVS) or near ZVS soft switching operation of one or more switches of the power distributor.

14. The apparatus recited in claim 8, wherein the plurality of N inverters are controlled by synchronized signals.

15. The apparatus recited in claim 8, wherein the net load impedances seen by the plurality of N inverters are inductive at the switching frequency of the N inverters to realize Zero Voltage Switching.

16. The apparatus recited in claim 8, wherein at least one switch in the power distributor circuit is implemented as a diode.

17. The apparatus recited in claim 1, wherein the voltage of at least one of the said input/output port comprises an ac line voltage, and the circuit performs power-factor correction via control of the switches in the power distributor circuit.

18. The apparatus recited in claim 17, wherein there is a twice-line-frequency energy buffer capacitor directly connected between a highest voltage level and the ground that is sized to buffer for power factor correction conversion.

19. The apparatus recited in claim 18, wherein the said capacitor connected between the highest voltage level and ground is an electrolytic capacitor which buffers the energy difference between that provided at the input port and that supplied to the output port.

20. The apparatus recited in claim 17, wherein the switches and inductors utilized in the power distributor are also utilized to realize bridgeless power factor correction.

21. A power conversion method employing a coupled split path (CSP) voltage converter, the method comprising:
distributing power from an input source of a power distributor circuit to a set of outputs of the power distributor circuit utilizing a set of switches to switch at least one terminal of an inductor among at least two outputs of the power distributor circuit;
generating a set of N voltage levels by a plurality of N inverter circuit cells, each of the plurality of N inverter circuit cells having an inputs, the wherein the inputs of the N inverter circuit cells are electrically coupled to respective outputs of the power distributor circuit, and wherein the inputs of the N inverter circuit cells are cascaded to form a series chain to generate the set of N voltage levels;
balancing the input voltages of the plurality of N inverter circuit cells via one or both of switched-capacitor energy transfer and magnetic coupling;
providing power from the plurality of N inverter circuit cells to the inputs of a magnetic component comprising three or more windings and operating via magnetic coupling to step up or down voltage; and
delivering power transferred via the magnetic component to an output by rectification.

22. The power conversion method of claim 21 further comprising:
utilizing exactly N=2 inverter cells; and
switching one terminal of said inductor among a reference potential, the input terminal of a first inverter cell and the input terminal of a second inverter cell.

23. The power conversion method of claim 22 further comprising:
providing said input source as an ac line voltage; and
providing a twice-line-frequency energy buffer capacitor across the cascade of inverter input terminals; and
further utilizing switching of said inductor terminal to provide power factor correction.

24. The power conversion method of claim 23 further comprising:
providing a second inductor or second inductor winding to form a coupled inductor; and
further utilizing switching of first and second inductor terminals to further provide rectification.

* * * * *